(12) United States Patent
Happel

(10) Patent No.: US 10,794,051 B1
(45) Date of Patent: Oct. 6, 2020

(54) INLINE BIOREMEDIATION LIQUID TREATMENT SYSTEM

(71) Applicant: SUNTREE TECHNOLOGIES HOLDINGS, LLC, Cocoa, FL (US)

(72) Inventor: Thomas H. Happel, Cocoa, FL (US)

(73) Assignee: SUNTREE TECHNOLOGIES HOLDINGS, LLC, Cocoa, FL (US)

( * ) Notice: Subject to any disclaimer, the term of this patent is extended or adjusted under 35 U.S.C. 154(b) by 0 days.

(21) Appl. No.: 16/380,449

(22) Filed: Apr. 10, 2019

Related U.S. Application Data

(62) Division of application No. 15/708,399, filed on Sep. 19, 2017, now Pat. No. 10,260,222.

(60) Provisional application No. 62/478,386, filed on Mar. 29, 2017.

(51) Int. Cl.

| | | |
|---|---|---|
| E03F 5/14 | (2006.01) |
| C02F 3/32 | (2006.01) |
| E03F 5/04 | (2006.01) |
| C02F 3/04 | (2006.01) |
| C02F 3/10 | (2006.01) |
| E03F 5/10 | (2006.01) |
| C02F 103/00 | (2006.01) |
| C02F 1/00 | (2006.01) |

(52) U.S. Cl.
CPC ............ E03F 5/0404 (2013.01); C02F 3/046 (2013.01); C02F 3/104 (2013.01); C02F 3/327 (2013.01); E03F 5/0402 (2013.01); E03F 5/101 (2013.01); E03F 5/14 (2013.01); *C02F 2001/007* (2013.01); *C02F 2103/001* (2013.01)

(58) Field of Classification Search
CPC . E03F 5/0404; E03F 5/101; E03F 5/14; C02F 3/046; C02F 3/32; C02F 3/327
USPC ............ 210/150, 170.01, 170.03, 602, 747.3
See application file for complete search history.

(56) References Cited

U.S. PATENT DOCUMENTS

| | | | | |
|---|---|---|---|---|
| 6,277,274 | B1 * | 8/2001 | Coffman | C02F 3/046 210/150 |
| 6,540,910 | B2 * | 4/2003 | Schwarzenegger | C02F 3/288 210/151 |
| 7,776,217 | B2 * | 8/2010 | Lucas | C02F 3/327 210/602 |
| 10,260,222 | B1 * | 4/2019 | Happel | E03F 5/0404 |
| 2008/0251448 | A1 * | 10/2008 | Kent | C02F 3/327 210/602 |
| 2009/0101555 | A1 * | 4/2009 | Scarpine | E03F 5/101 210/170.03 |
| 2009/0255868 | A1 * | 10/2009 | Allen, II | C02F 3/327 210/602 |
| 2015/0041379 | A1 * | 2/2015 | Kent | E03F 5/0404 210/170.03 |
| 2016/0017587 | A1 * | 1/2016 | He | C02F 3/04 210/170.03 |

* cited by examiner

*Primary Examiner* — Christopher Upton
(74) *Attorney, Agent, or Firm* — Lott & Fischer, PL

(57) ABSTRACT

A liquid treatment system is provided having a vault that contains a treatment chamber and an outflow chamber. The treatment chamber may have a filtration media layer containing media that treats liquid as it descends through the filtration media layer, where it will accumulate in a porous layer or open space. The liquid will then be directed through the plurality of pipes to the outflow chamber, where the treated liquid is further directed to outside the system. Accumulated debris settled at the bottom of the treatment chamber may be flushed out by a spray bar.

12 Claims, 22 Drawing Sheets

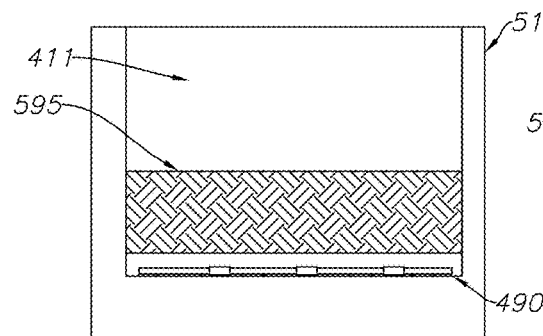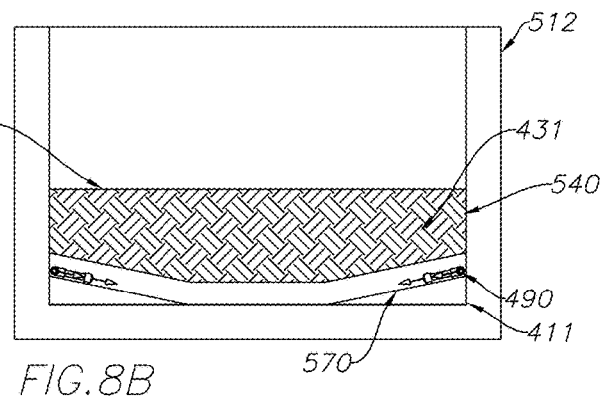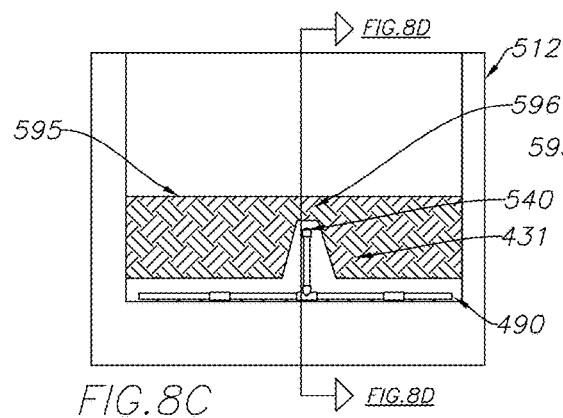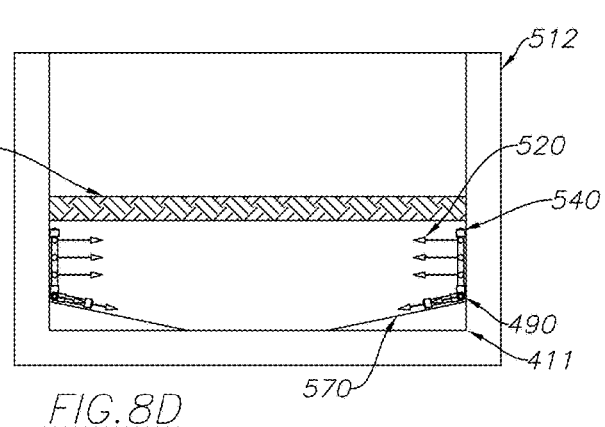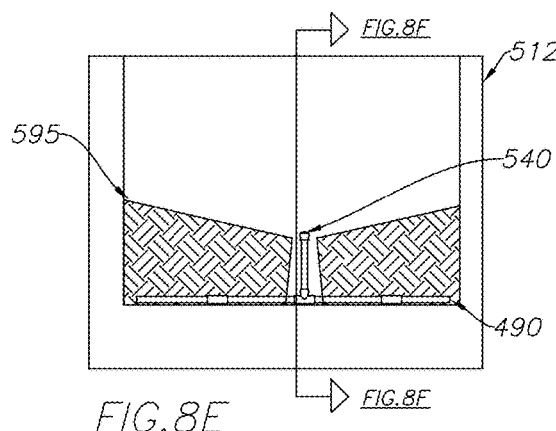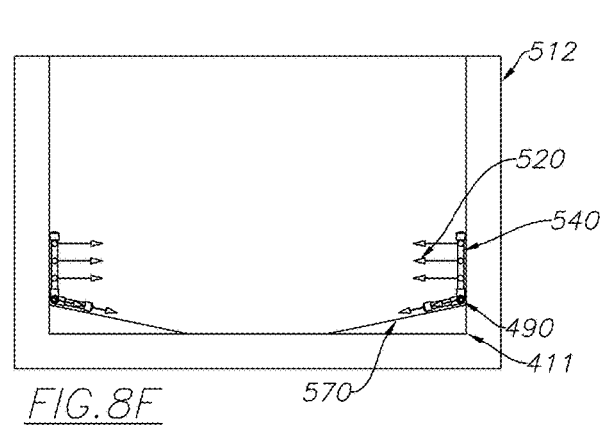

INLINE BIOREMEDIATION LIQUID TREATMENT SYSTEM

CLAIM OF PRIORITY

This application is a divisional of U.S. non-provisional patent application Ser. No. 15/708,399 filed on Sep. 19, 2017, now U.S. Pat. No. 10,260,222, which claims priority to U.S. provisional patent application Ser. No. 62/478,386 filed on Mar. 29, 2017, the contents of which are incorporated herein by reference.

FIELD OF INVENTION

The invention relates generally to water detention and treatment systems and in particular to a system and method for filtration of pollutants from stormwater runoff.

BACKGROUND OF THE INVENTION

Stormwater treatment systems typically remove solids from stormwater flow. These solids represent a major portion of the pollutant load contained in stormwater runoff. Current federal, state, and local stormwater treatment guidelines require that all stormwater runoff receive treatment to prevent the conveyance of pollution to downstream receiving water bodies.

An underlying problem with current stormwater treatment is that achieving greater pollutant removal efficiency may result in a reduction of the hydraulic conveyance, which may compromise the hydrology of the water shed. Historically, stormwater management has been primarily about flood prevention. Because of governmental mandates and environmental necessity, current stormwater management includes the prevention of the conveyance of pollutants. There is a necessity to prevent both flooding and the transmission of pollutants.

Because there is not a single stormwater treatment technique that is best for removing all pollutants, a treatment system that utilizes multiple techniques of filtration and retention, will yield a more successful and efficient stormwater treatment system. Additionally, all stormwater treatment systems require servicing, and a treatment system that employs multiple techniques will likely mitigate the substantial costs and labor associated with servicing current stormwater treatment systems.

Servicing a stormwater treatment system requires manual labor, equipment, and financial resources. Being able to service efficiently will yield the capture of more debris. Additionally, being able to service quickly with minimal manual labor will reduce the costs of servicing.

Accordingly, the current invention aims to provide a liquid treatment system that provides greater retention and filtration of stormwater, while increasing the efficiency and minimizing the resources utilized to conduct servicing of the treatment system.

SUMMARY OF THE INVENTION

The following summary is provided to introduce a selection of concepts in a simplified form that are further described below in the detailed description. This summary is not intended to identify key features or essential features of the claimed subject matter, nor is it intended to be used to limit the scope of the claimed subject matter.

According to one implementation, the liquid treatment system has a vault that contains a treatment chamber and an outflow chamber. The treatment chamber may have a filtration media layer containing media that treats liquid as it descends through the filtration media layer. As liquid passes through the filtration media layer, it will eventually accumulate in a porous layer or open space, where it will subsequently be drawn through perforated portions of a plurality of pipes. The liquid will then be directed through the plurality of pipes to an outlet, where the treated liquid is further directed to outside the system.

Accumulated debris may settle at the bottom of the treatment chamber. A spray bar with a plurality of orifices is mounted in the bottom portion of the treatment chamber. The treatment chamber may include a floor having a sloped surface, wherein the spray bar may work in conjunction with the sloped surface to flush debris settled in the treatment chamber to a predetermined location for pickup by a vacuum hose.

Although the invention is illustrated and described herein as embodied in a liquid treatment system, it is nevertheless not intended to be limited to only the details shown, since various modifications and structural changes may be made therein without departing from the spirit of the invention and within the scope and range of equivalents of the claims.

These and other features and advantages will be apparent from a reading of the following detailed description, and a review of the appended drawings. It is to be understood that the foregoing summary, the following detailed descriptions, and the appended drawings are only explanatory and are not restrictive of various aspects claimed.

BRIEF DESCRIPTION OF THE DRAWINGS

FIGS. 8A-8F are sectional views illustrating the steps in the collapsing of a compacted debris bridge that has formed in the open space in accordance with an implementation of the invention.

DETAILED DESCRIPTION OF THE INVENTION

Figure 1A:
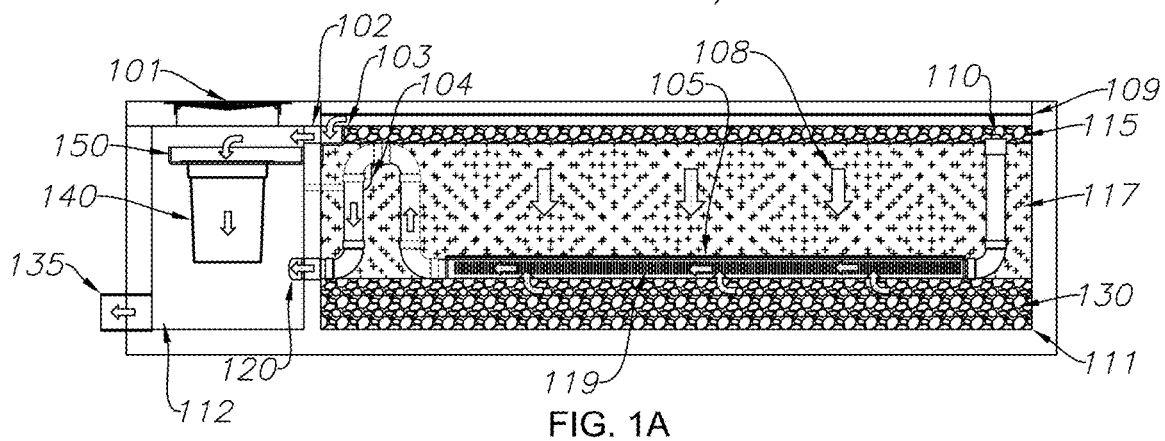
FIGS. 1A-1I are views from different angles of the liquid treatment system in accordance with an implementation of the invention.
Figure 1B:
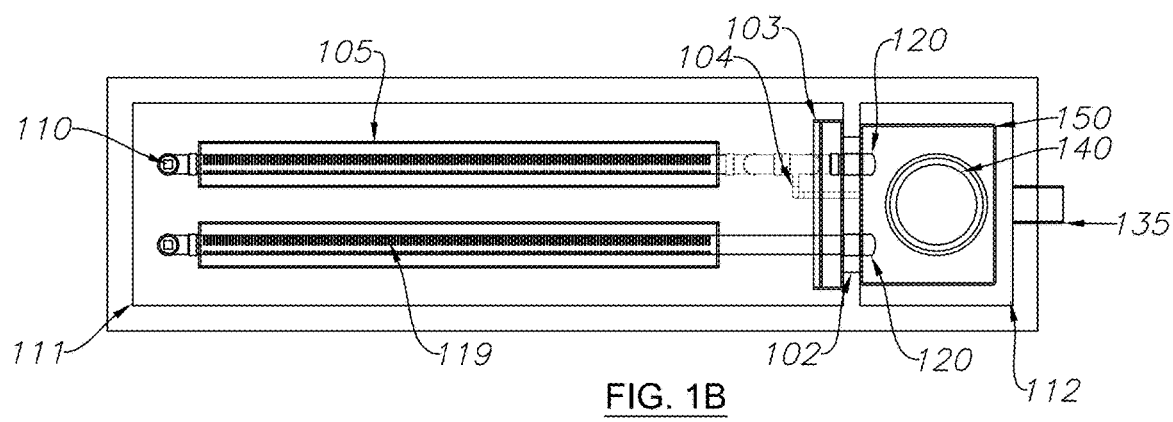
Figure 1C:
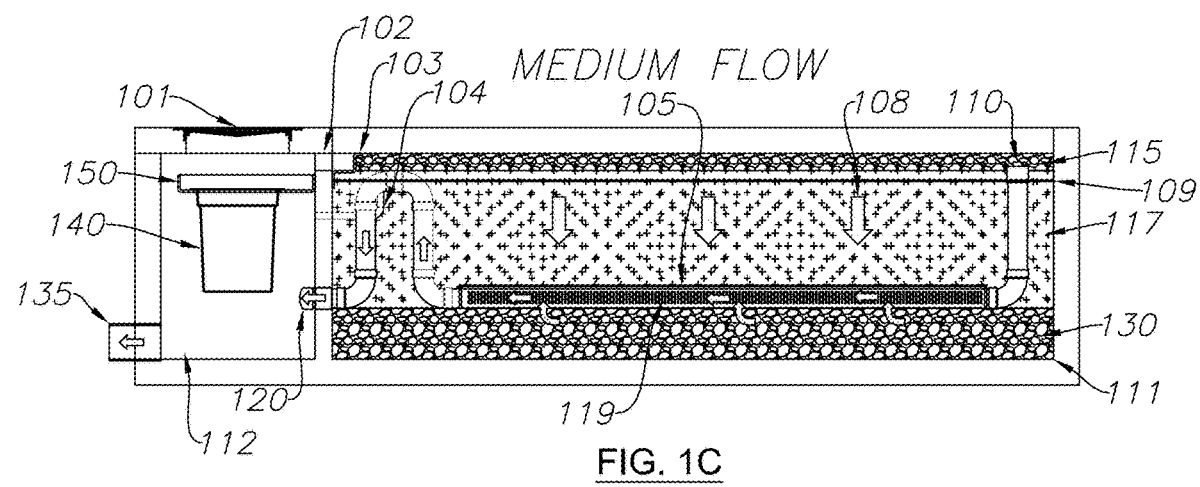

Implementations of the invention provide a liquid treatment system that prevents a wide spectrum of pollutants from being conveyed to a receiving body of water or landscape area.

As used herein, the term "distal" end generally refers to the end that is further from the outflow chamber.

Additionally, the term "proximal" end generally refers to the end that is closer to the outflow chamber.

Referring to FIGS. 1A-1I, an example implementation of a liquid treatment system is shown having a vault 100 which may be fabricated from, but not limited to, concrete, fiberglass, or plastic. The shape of the vault is not limited to any particular shape, and may be rectangular, square, round, octagon or oval, among other shapes. The vault 100 may house a treatment chamber 111 and an outflow chamber 112. The treatment chamber 111 may be comprised of one or more walls and a floor. The treatment chamber 111 may contain a filtration media layer 115 adjacent to the top of the treatment chamber 111. The filtration media layer 115 may contain filtration media 117 which may consist of at least two sizes and/or types of media 117. This media 117 may be granular in shape and is not limited to any size or type. The filtration media layer 115 may also be suitable for sustaining living plants. The filtration media layer 115 acts as a liquid inlet positioned to direct liquid into the treatment chamber 111 from outside the treatment system. Liquid may be received by the filtration media layer 115 and eventually travel downward through the media 117 located within the treatment chamber 111.

The media 117 of the filtration media layer 115 is located directly above a plurality of pipes 119. The plurality of pipes 119 may be slightly inclined but substantially horizontal. At least a portion of each plurality of pipes 119 may be perforated. The plurality of pipes 119 are positioned to direct liquid from the treatment chamber 111 into the outflow chamber 112 through an outlet 120 at the distal ends of the plurality of pipes 119. The plurality of pipes 119 may include an inlet 110 at their proximal ends to allow for servicing and cleaning of the plurality of pipes 119. A liquid source may be coupled to the inlet 110 and provide liquid to the plurality of pipes 119 to ultimately flush out any sediment that may be caught in the plurality of pipes 119.

Figure 1D:
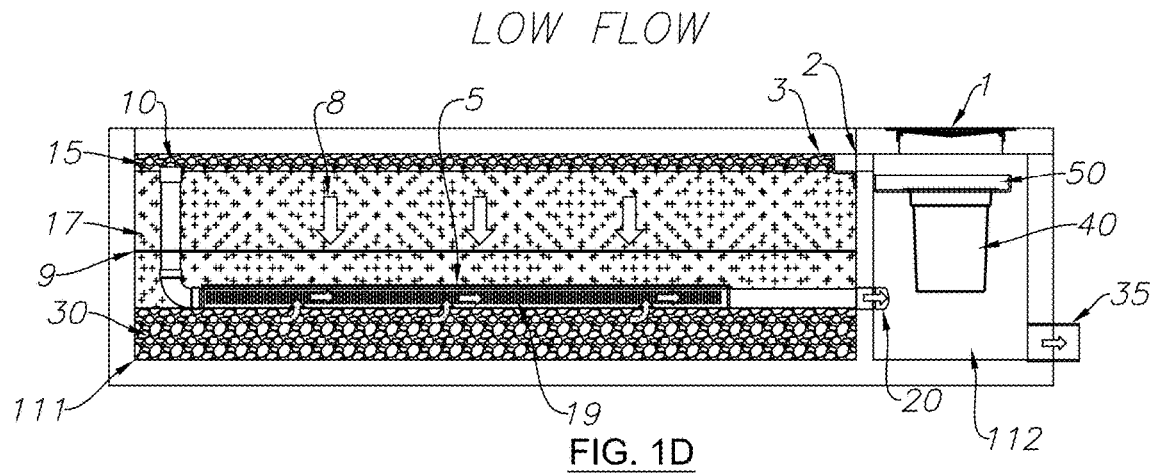
Figure 1E:
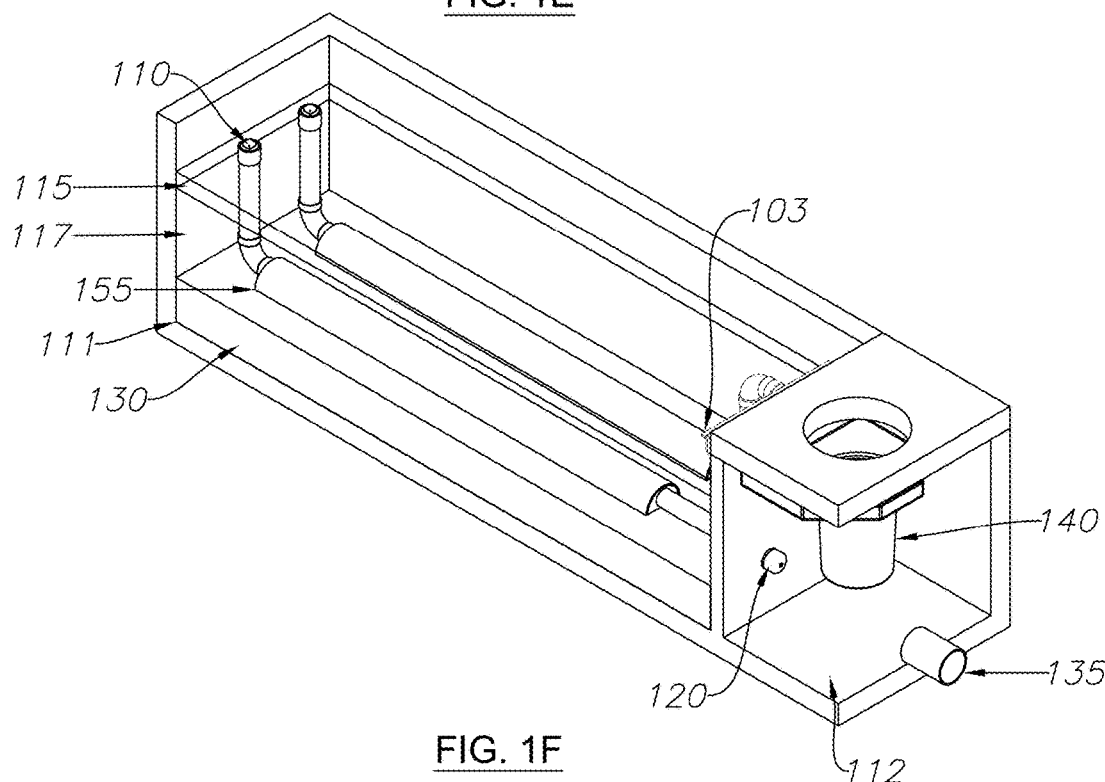
Figure 1F:
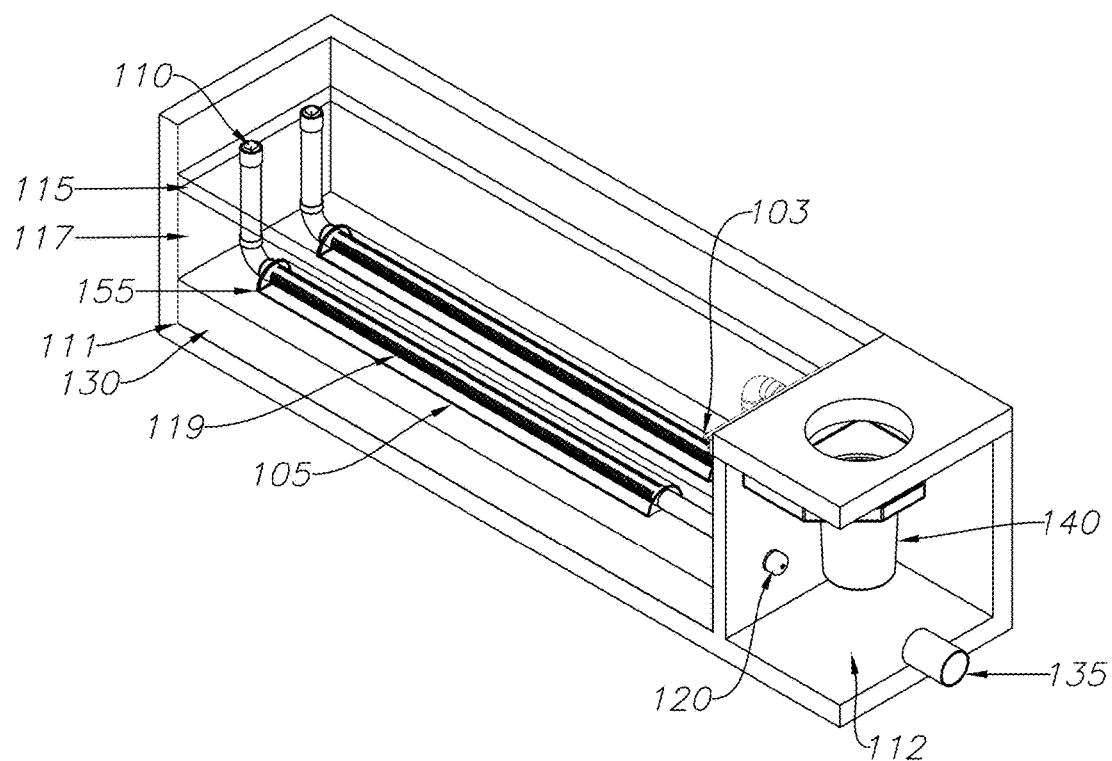
Figure 1G:
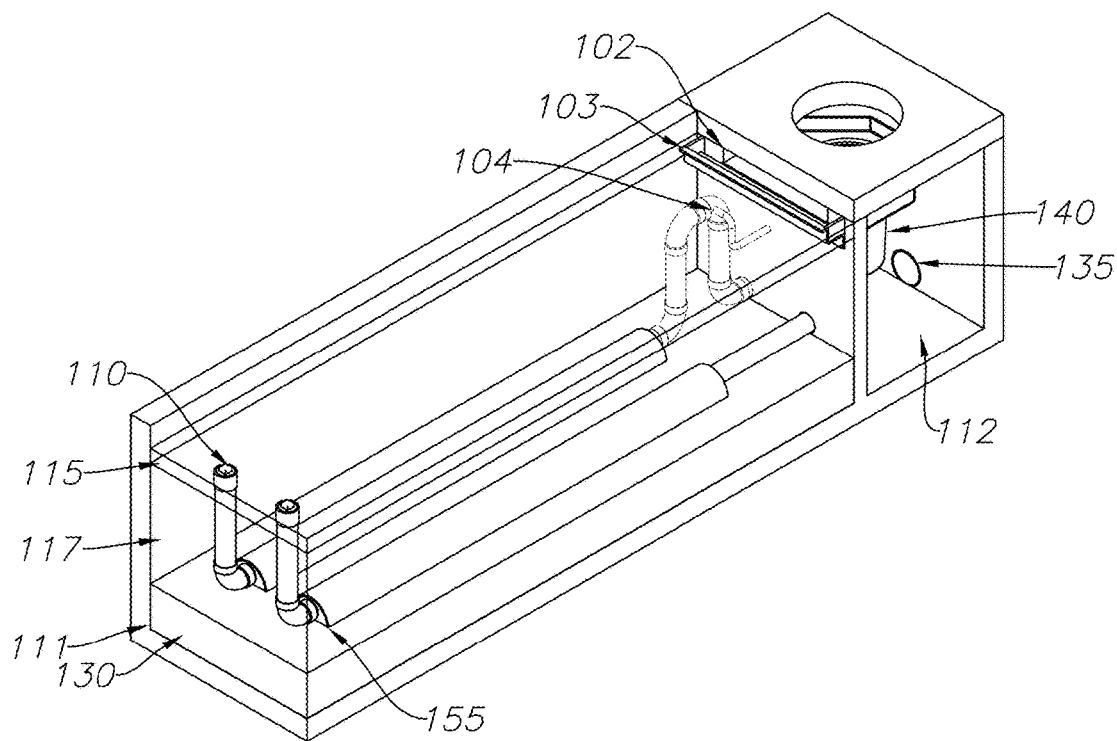
Figure 1H:
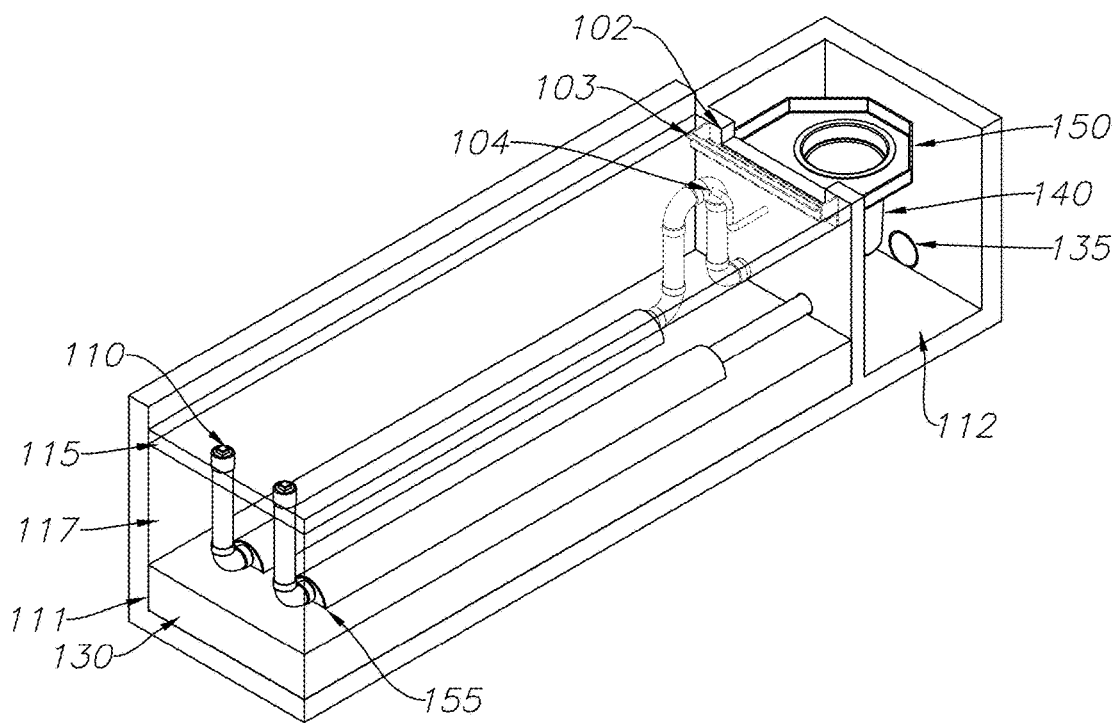
Figure 1I:
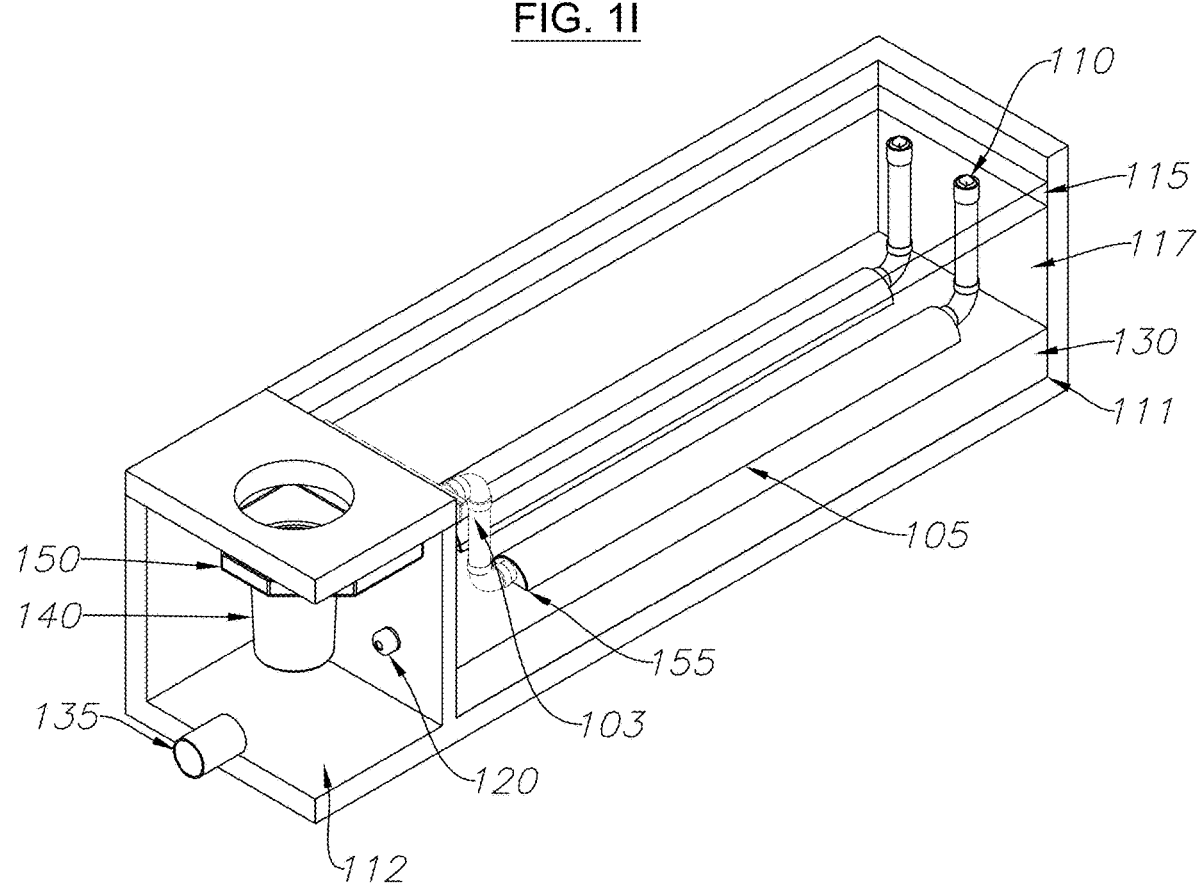
Figure 2A:
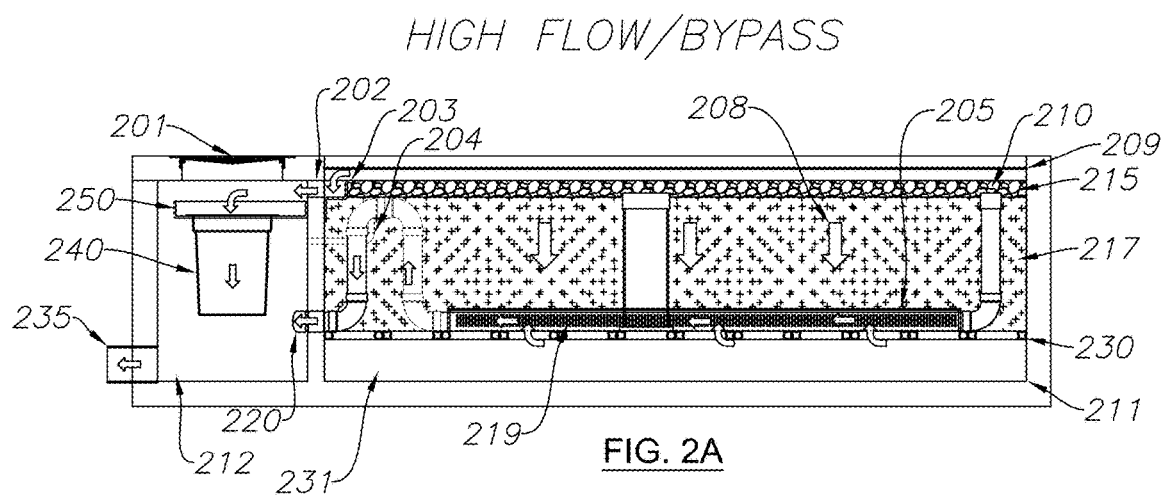
FIGS. 2A-2I are views from different angles of the liquid treatment system having a service portal, a permeable screen structure, and an open space in accordance with an implementation of the invention.
Figure 2B:
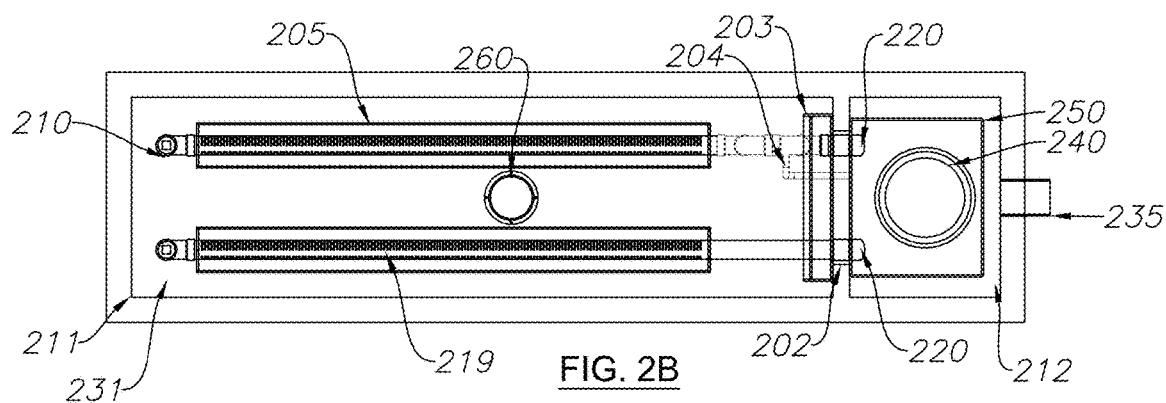
Figure 2C:
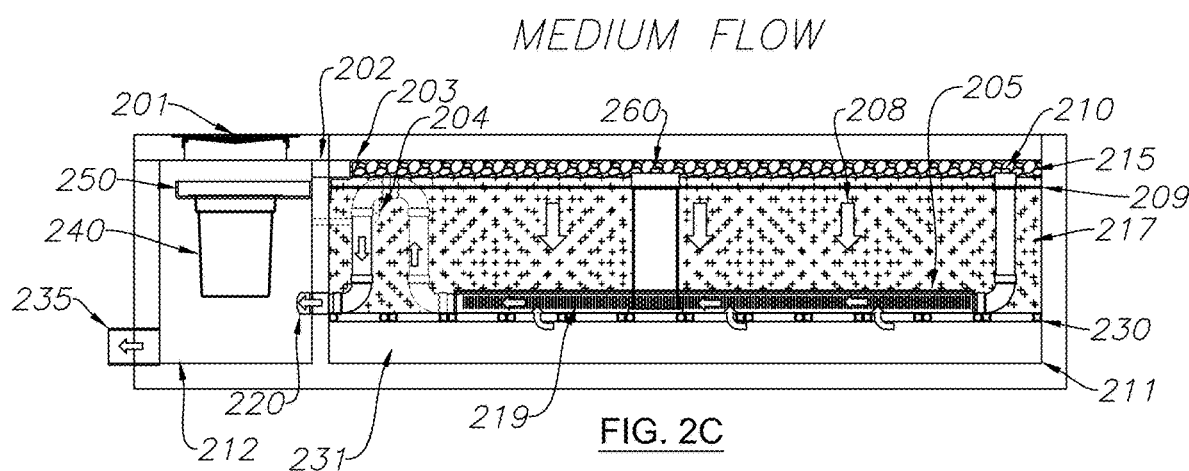
Figure 2D:
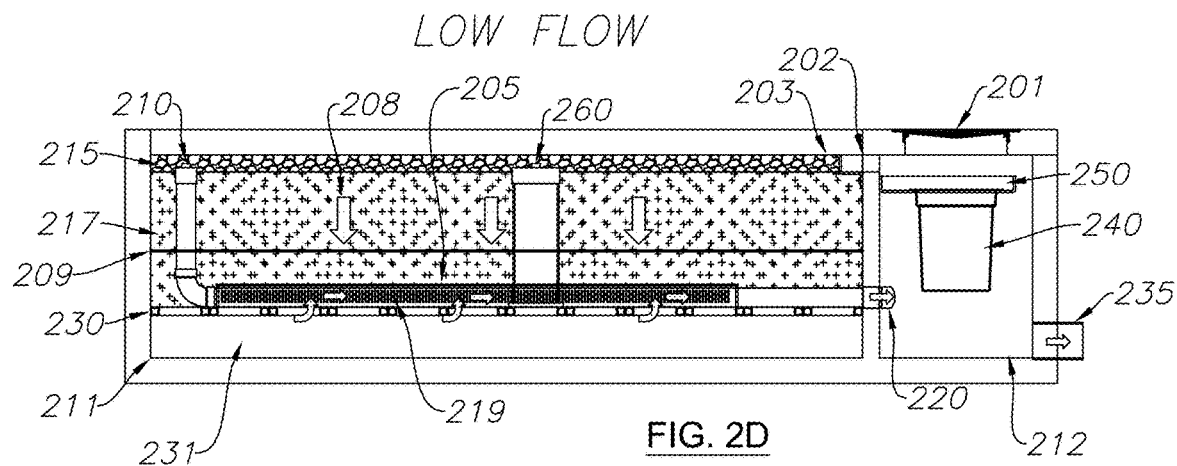
Figure 2E:
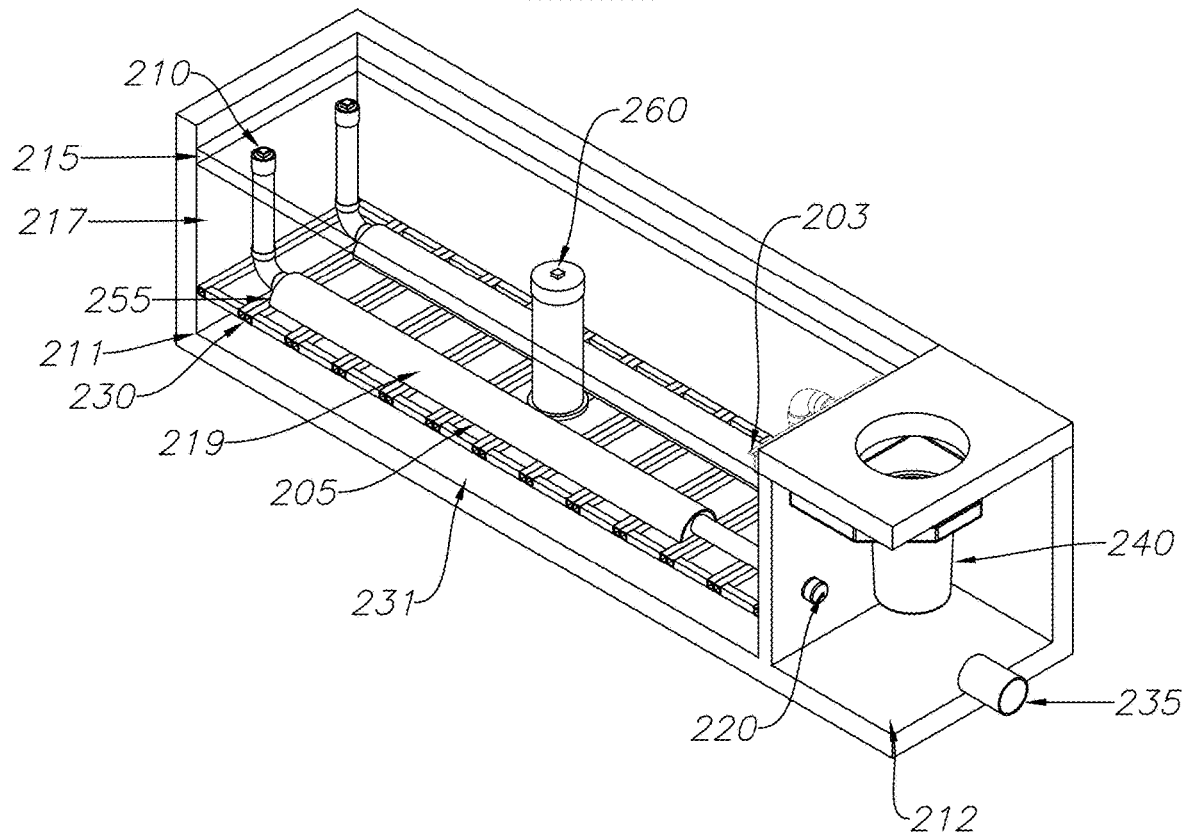
Figure 2F:
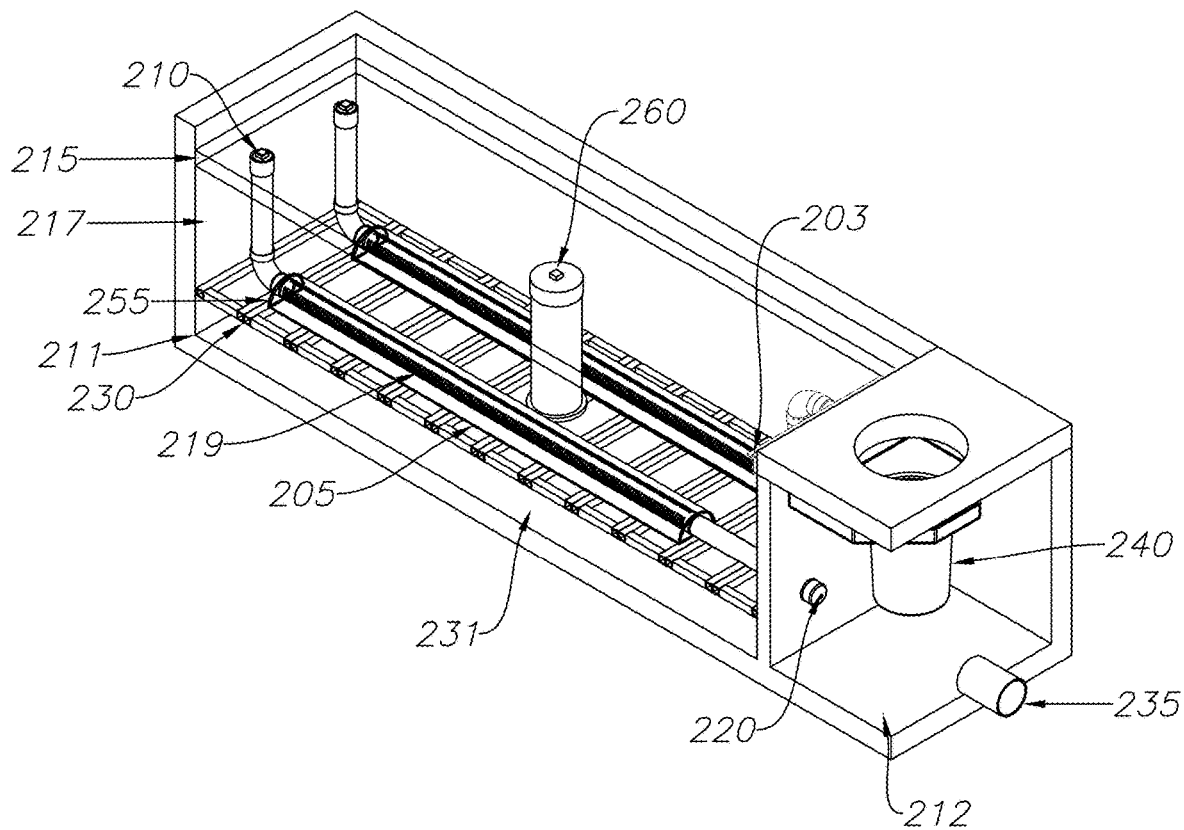
Figure 2G:
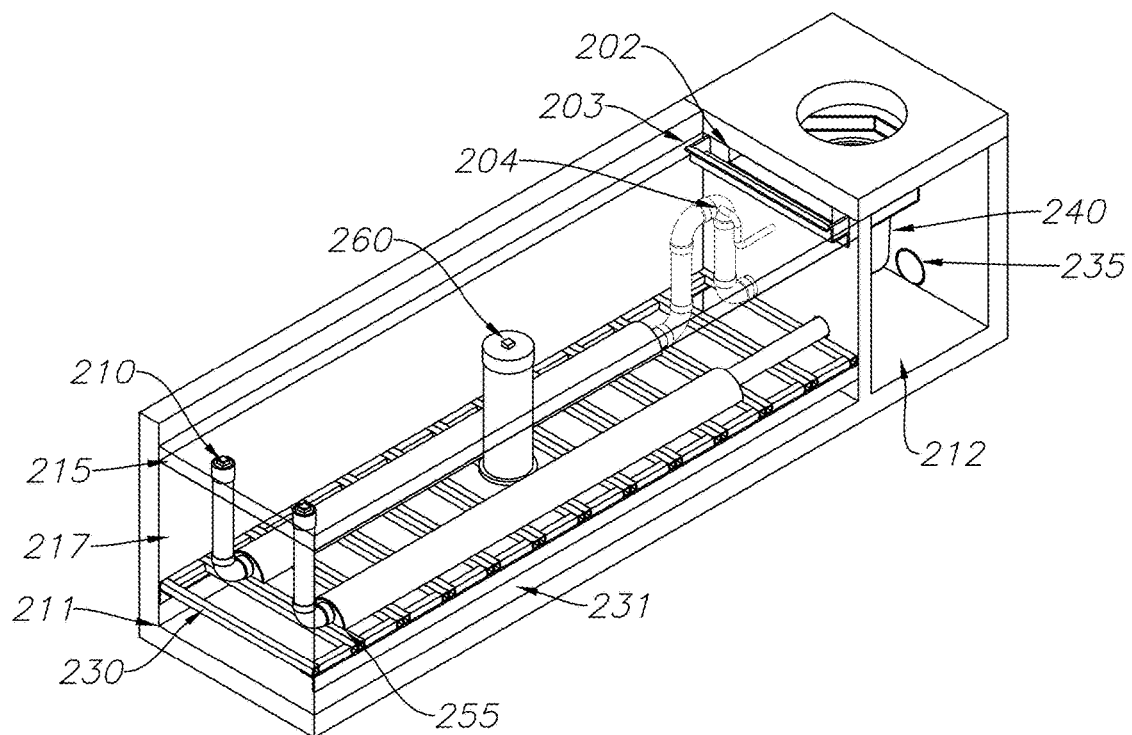
Figure 2H:
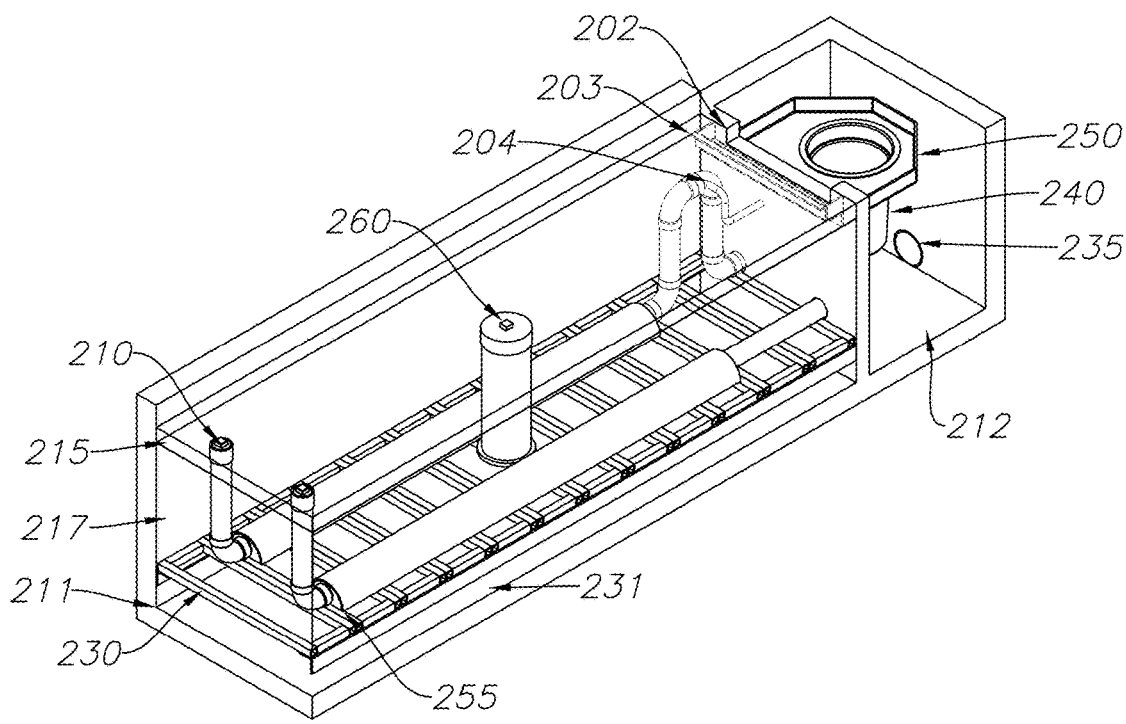
Figure 2I:
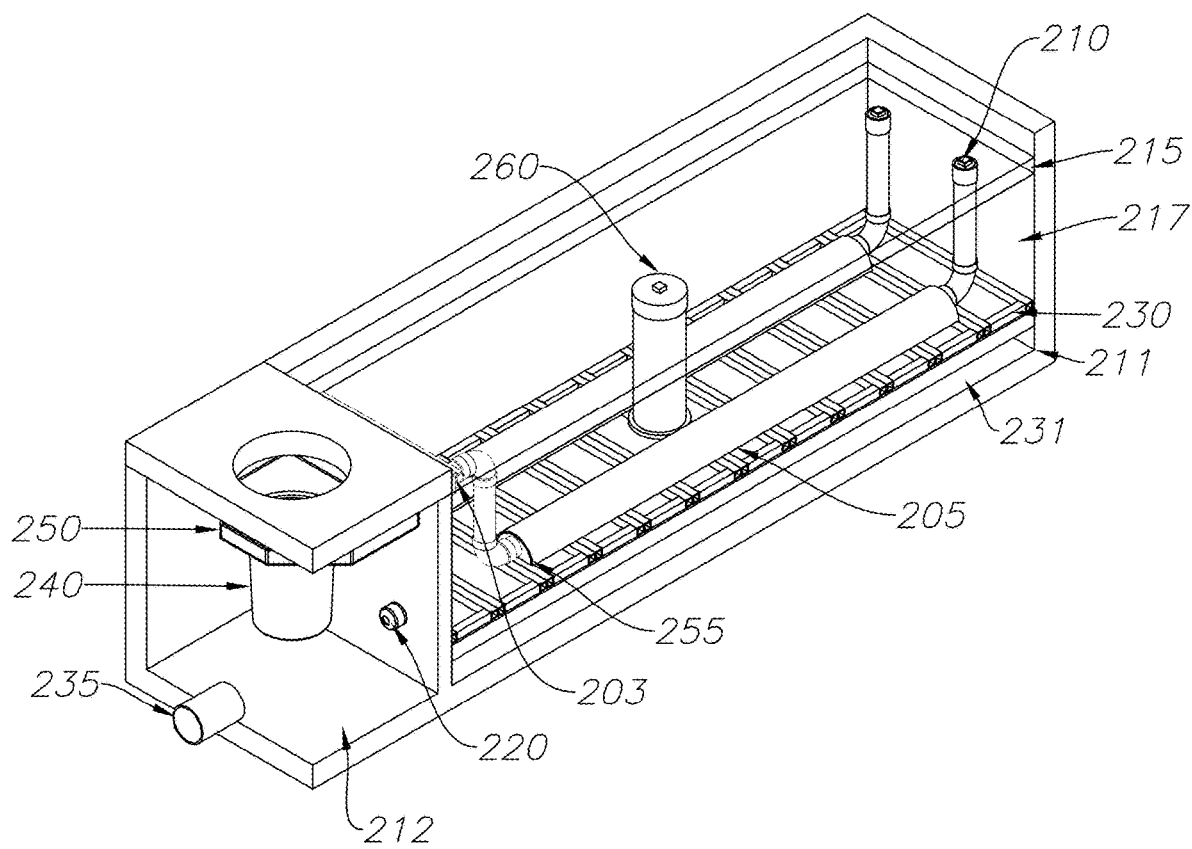
Figure 3A:
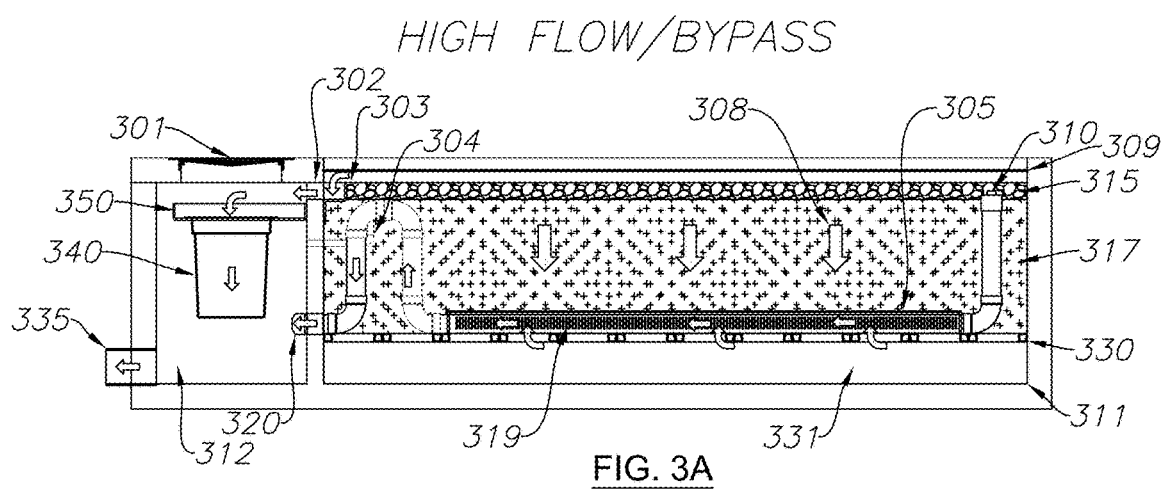
FIG. 3A-3H are views from different angles of the liquid treatment system showing additional features in accordance with an implementation of the invention.
Figure 3B:
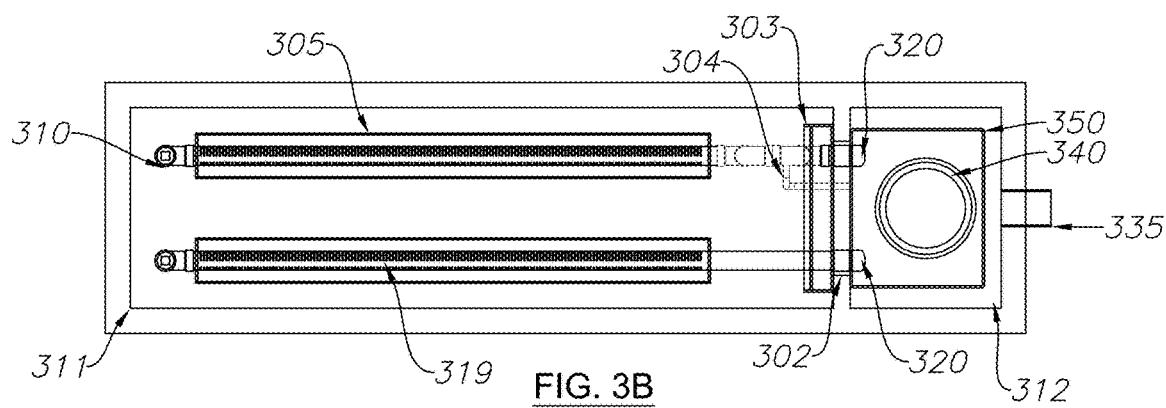
Figure 3C:
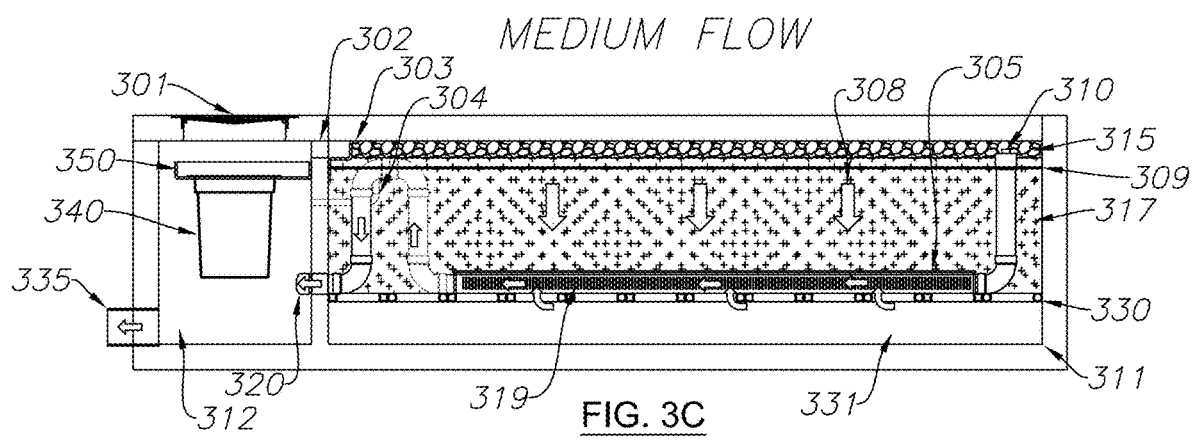
Figure 3D:
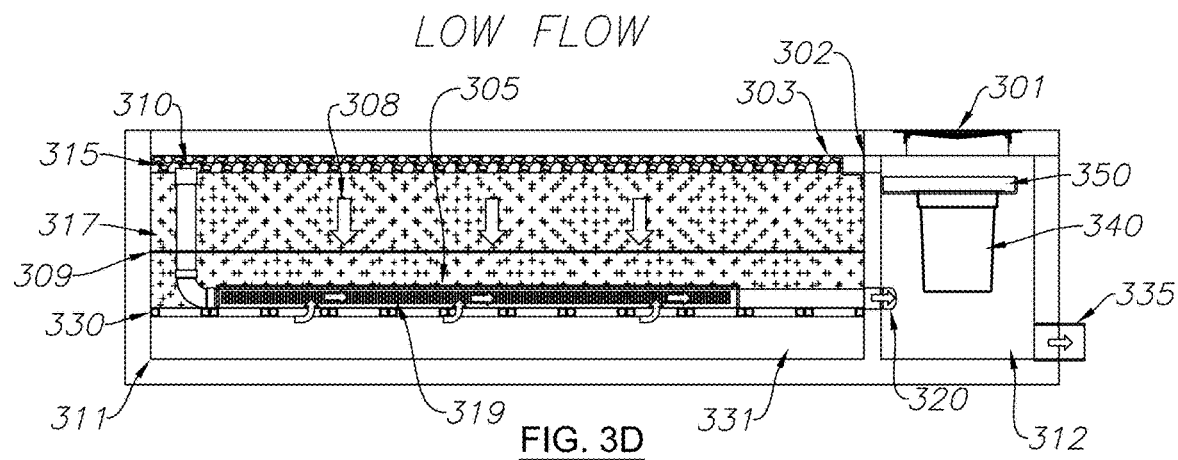
Figure 3E:
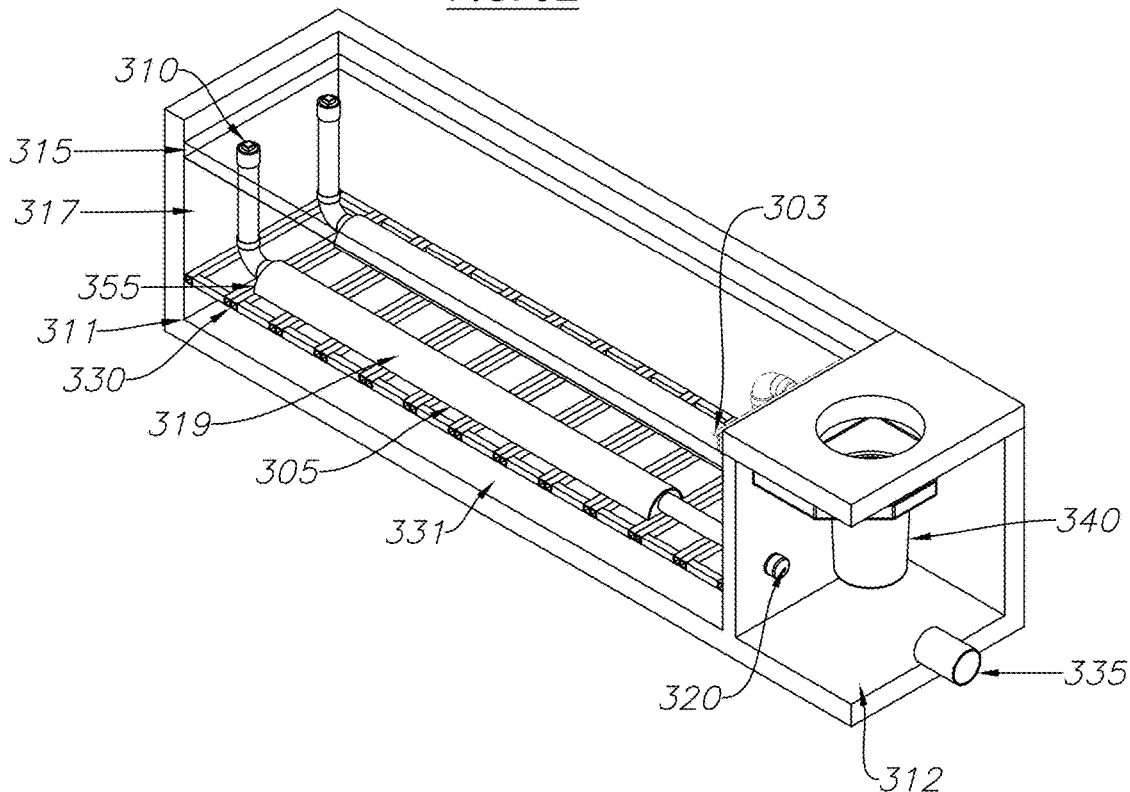
Figure 3F:
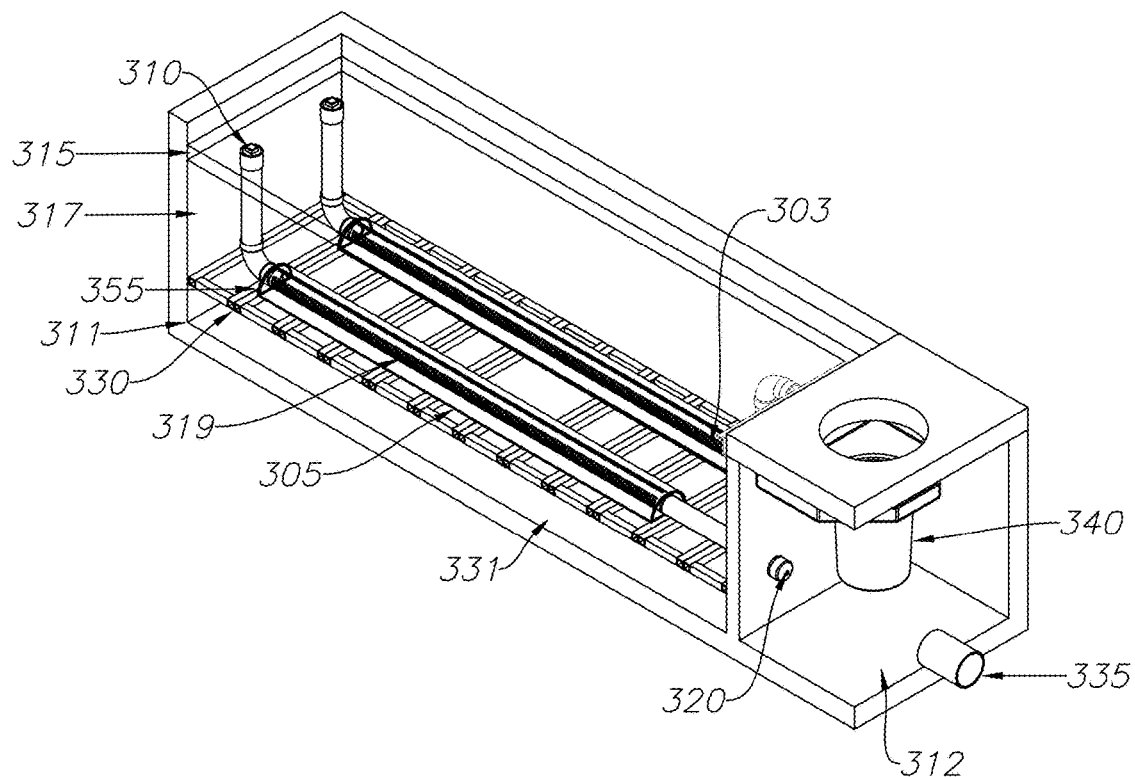
Figure 3G:
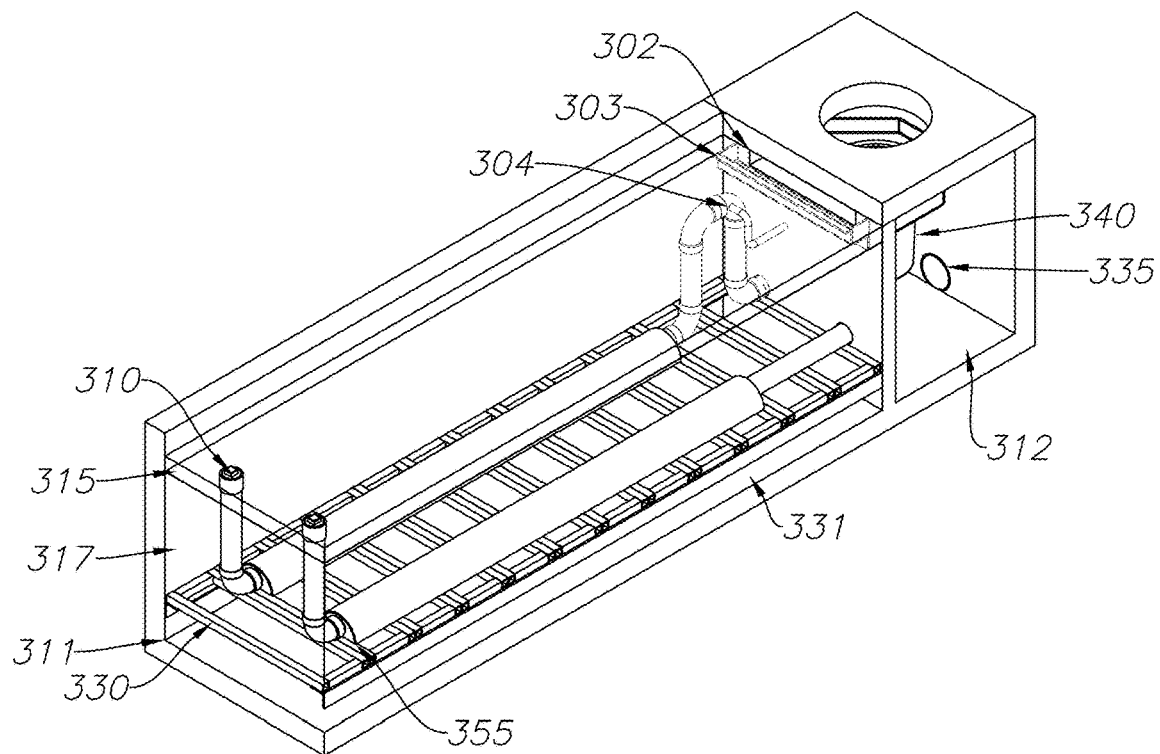
Figure 3H:
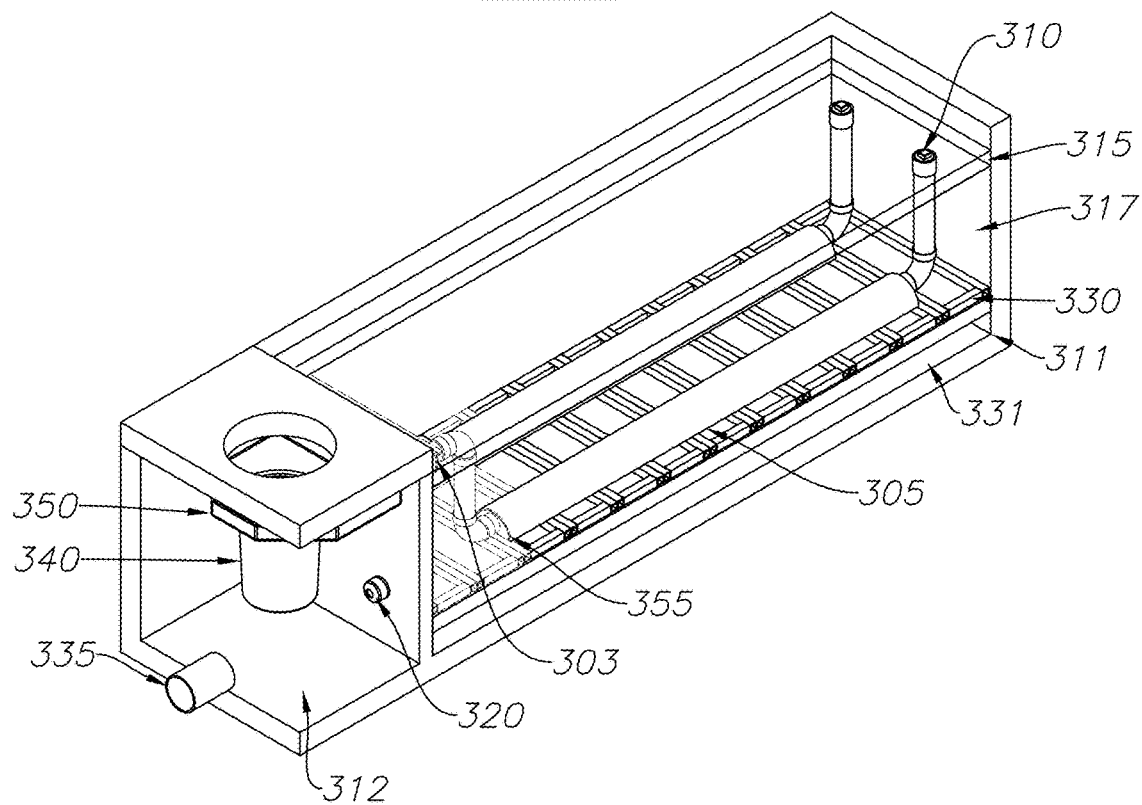
Figure 4A:
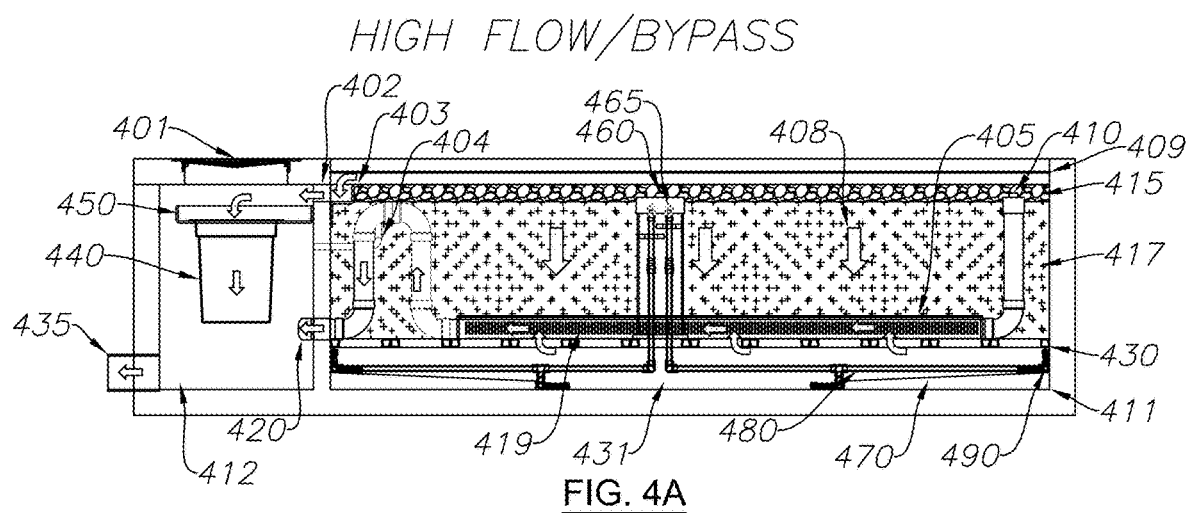
FIGS. 4A-4I are views from different angles of the liquid treatment system having a service portal, a permeable screen structure, an open space, and a high-pressure water spray system in accordance with an implementation of the invention.
Figure 4B:
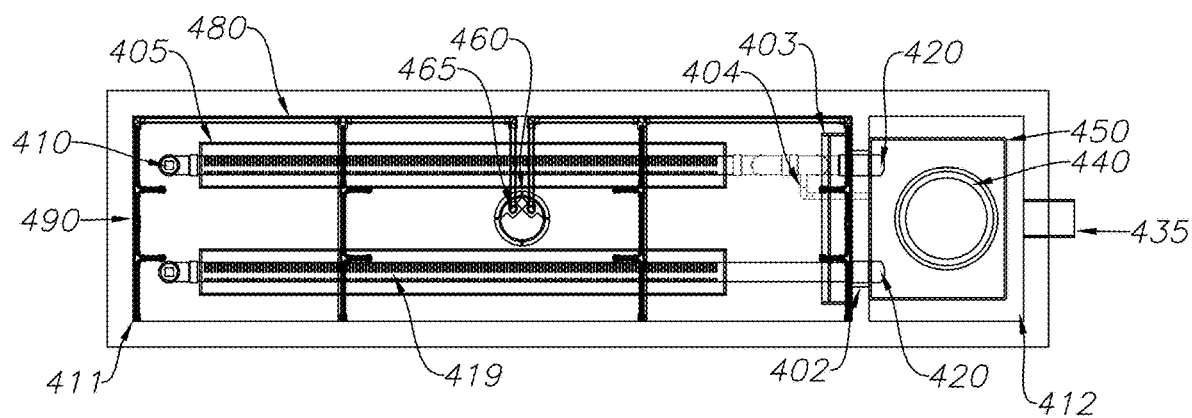
Figure 4C:
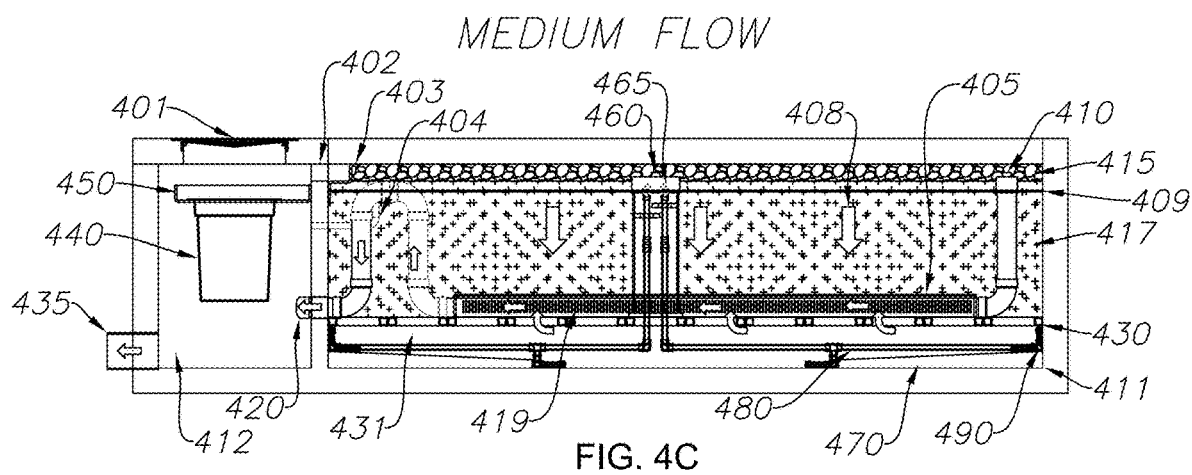
Figure 4D:
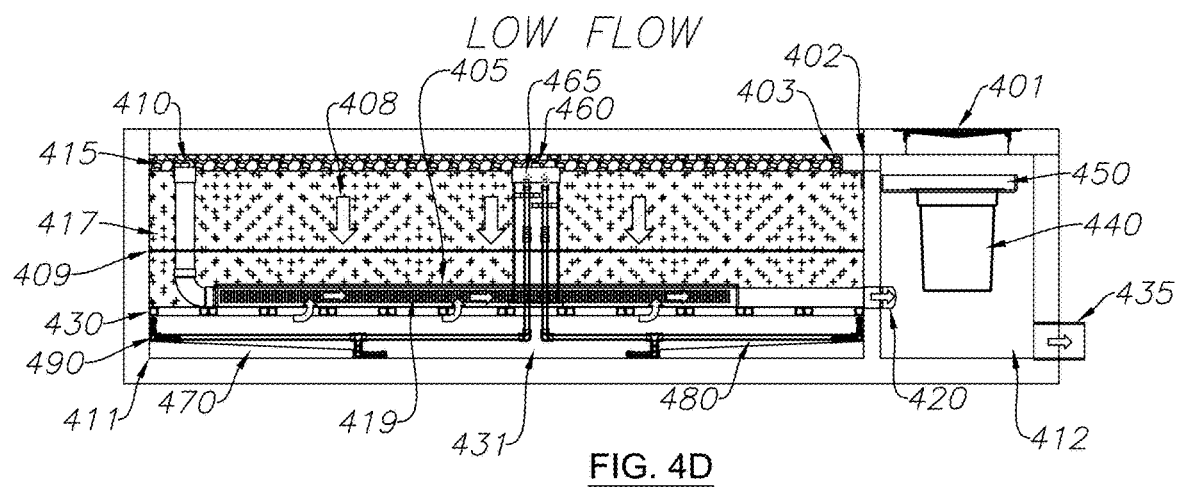
Figure 4E:
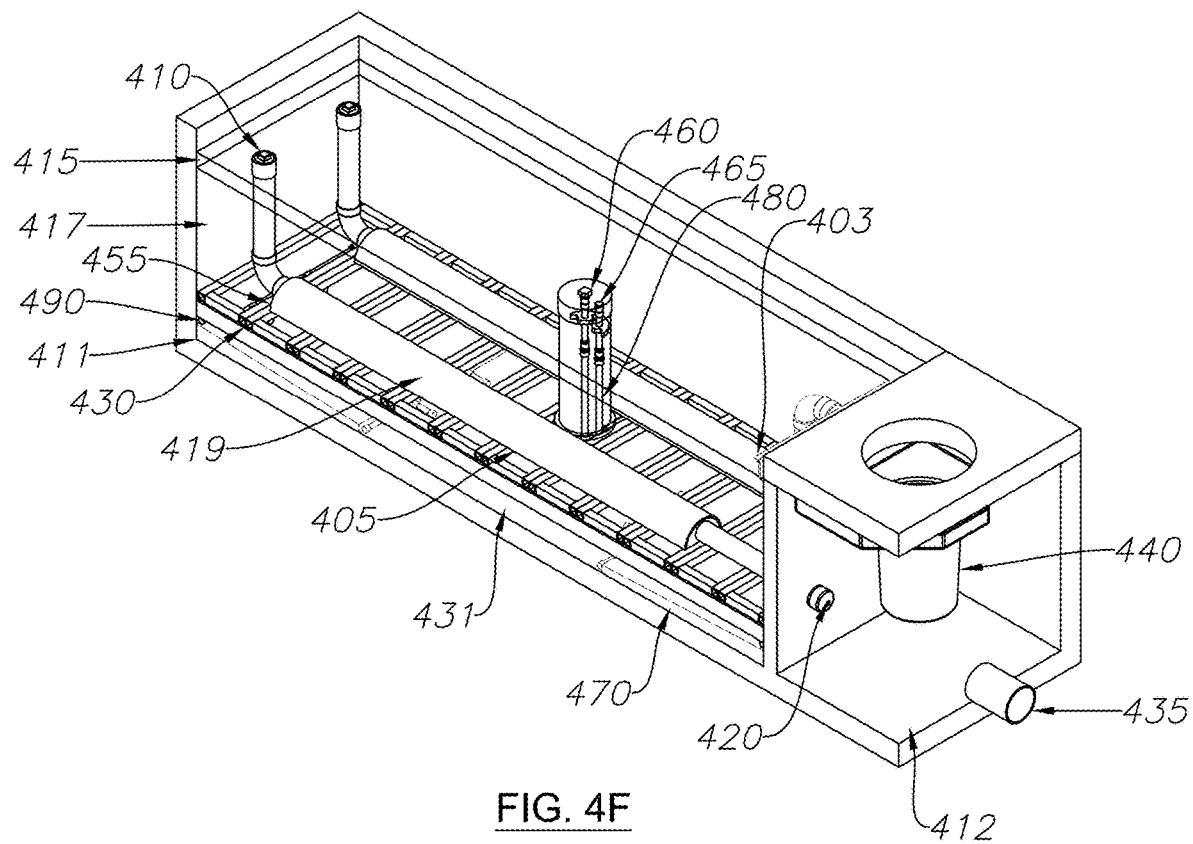
Figure 4F:
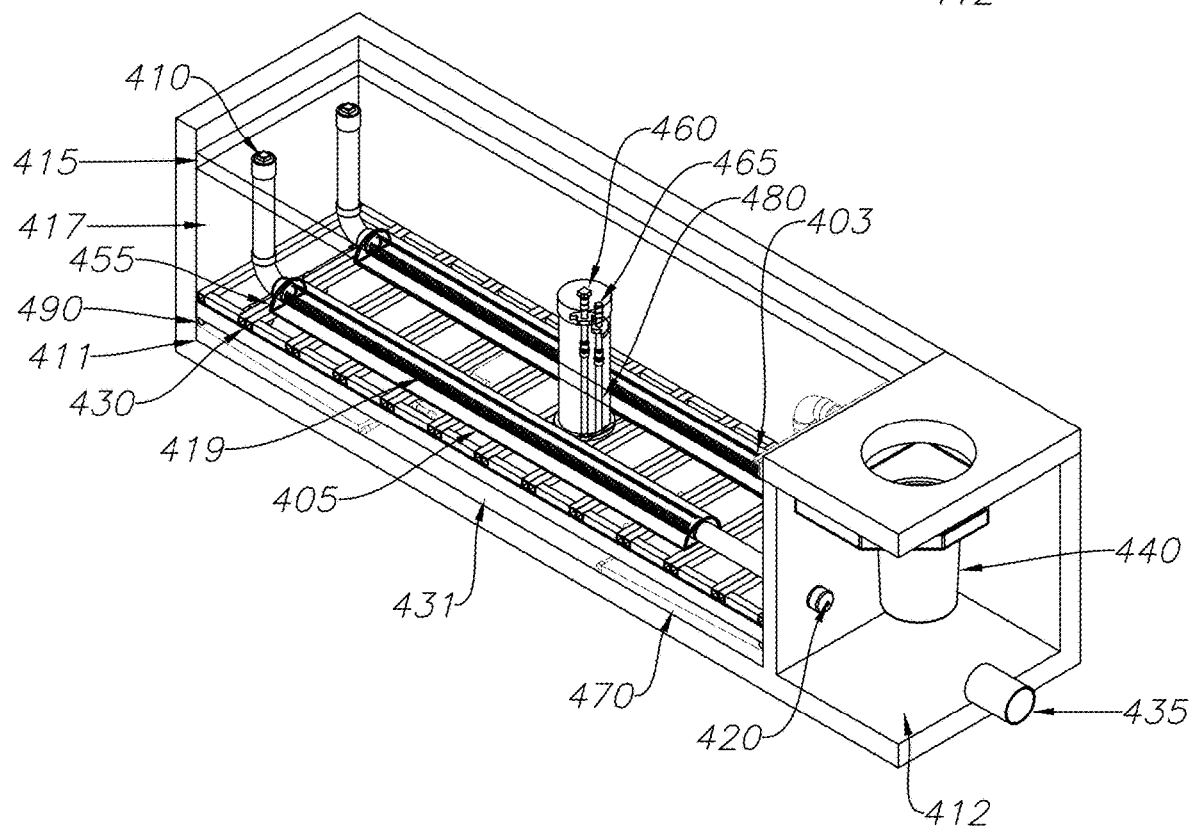
Figure 4G:
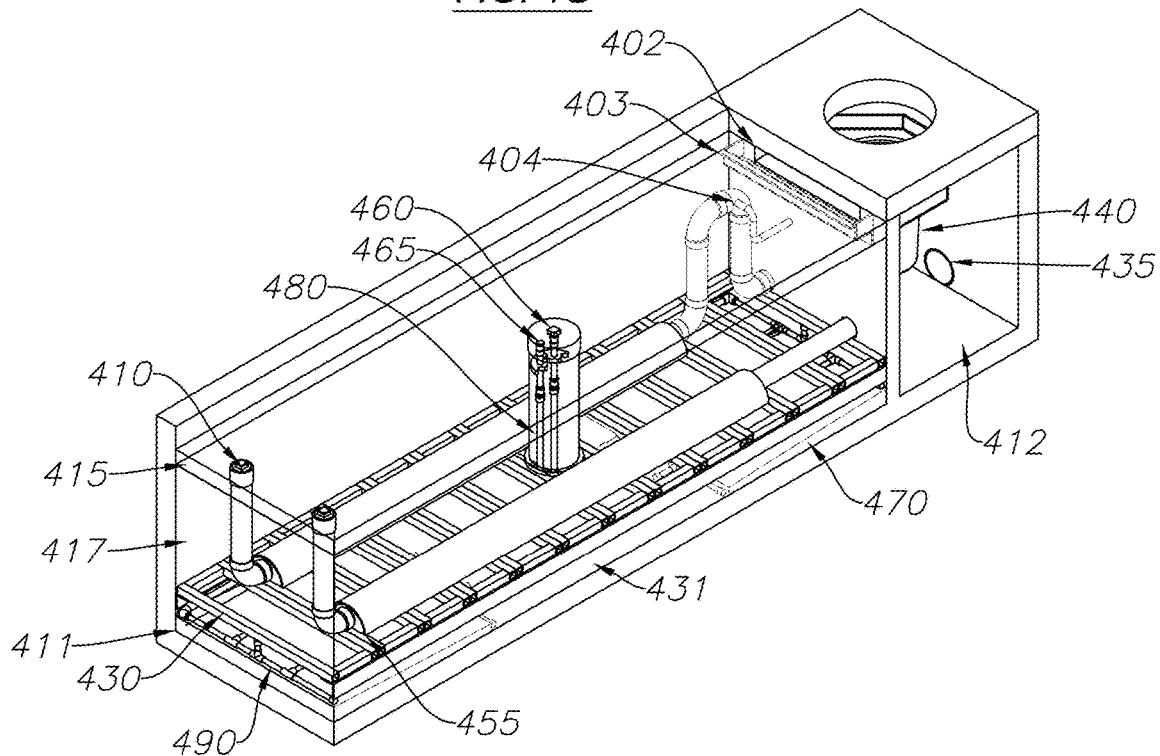
Figure 4H:
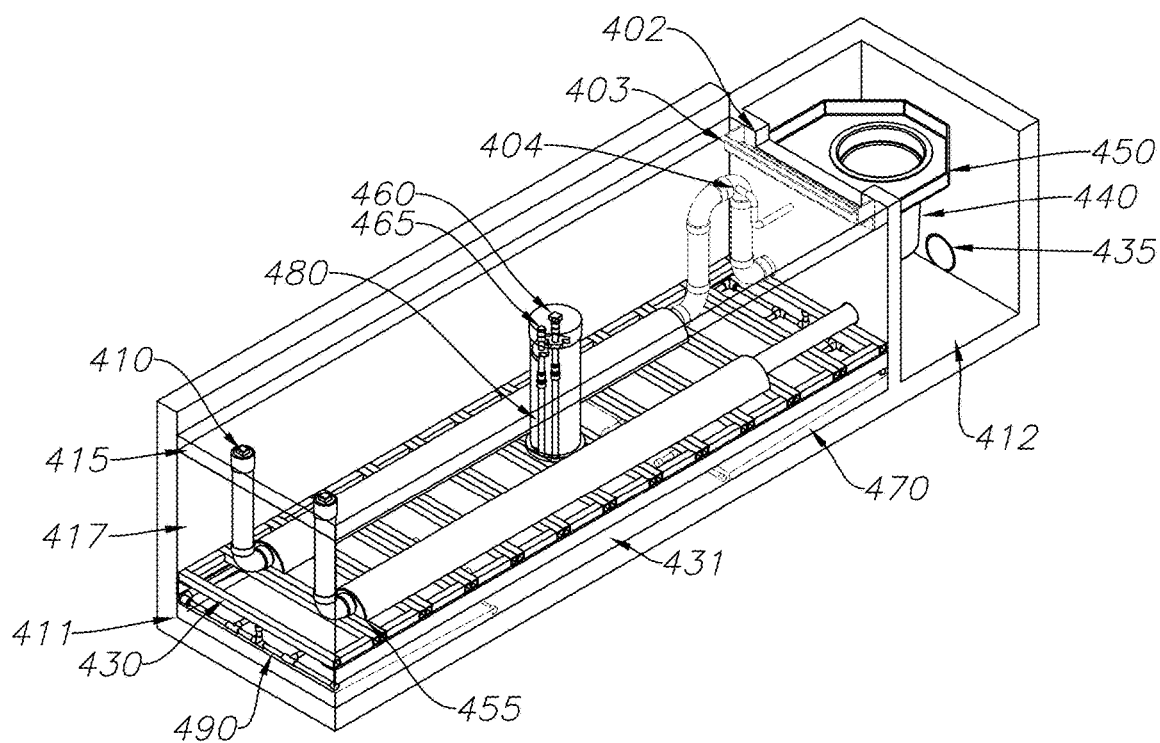
Figure 4I:
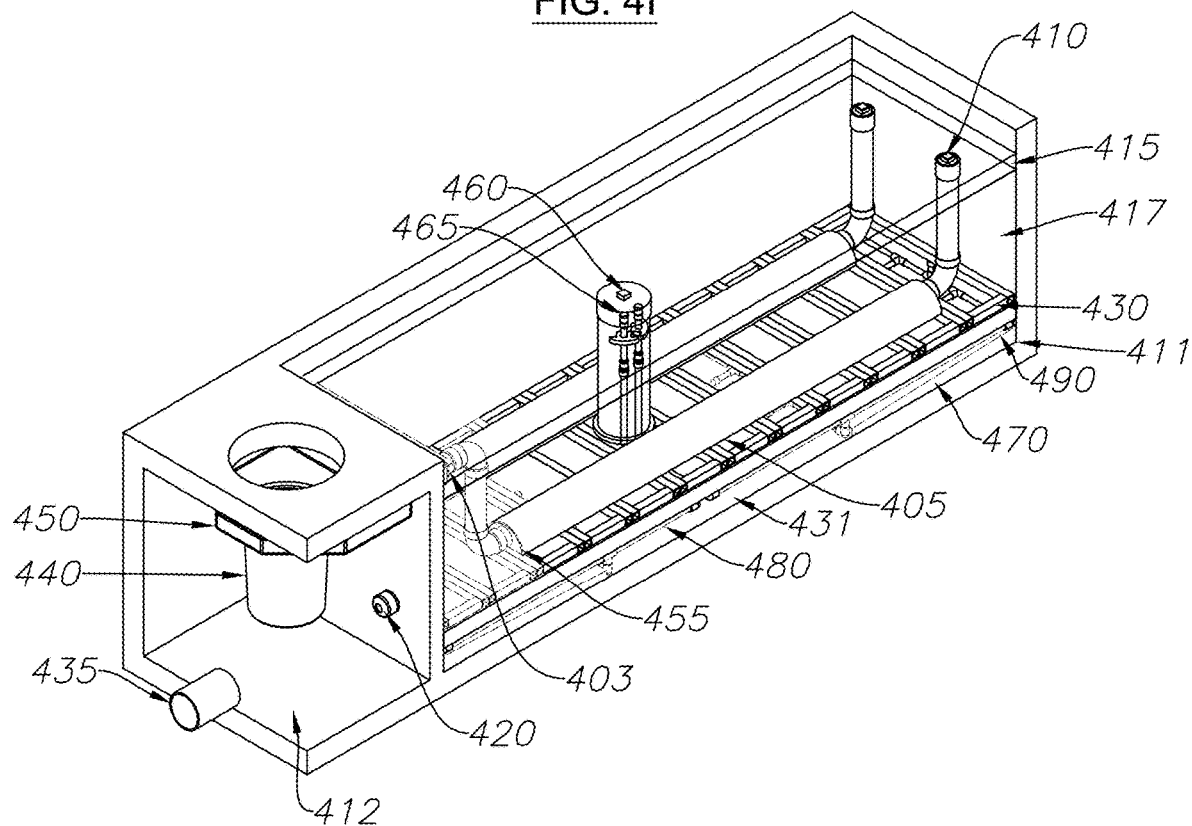

The plurality of pipes 119 may have a plurality of maximum flow rates. For example, one of the plurality of pipes 119 may have a low flow that serves to convey minimal flow with a drain down capability (as shown in FIG. 1D). A low flow pipe can serve to maximize contact time between the filtration media 117 and the liquid flow. Alternatively, one of the plurality of pipes 119 may have a high flow that serves to increase the liquid flow through the filtration media 117 before the liquid flow begins to bypass the filtration media 117. A high flow pipe may convey liquid flow at a faster rate than a low flow pipe. A high flow pipe may have an intermediate portion, downstream of the perforated portion, which is elevated with respect to the remaining portions of the pipe (as shown in FIG. 1A). An air vent 104 may be attached to the top of the elevated portion to connect the pipe to the ambient air outside of the treatment system. The air vent 104 allows ambient air to enter the pipe so that liquids can flow smoothly through the pipe. The air vent 104 is adapted to prevent liquids from entering the pipe through the air vent 104.

The plurality of pipes 119 are supported by a porous layer 130 that is adjacent to the bottom of the treatment chamber 111. The porous layer 130 may consist of gravel or any other additional media suitable to function as a settling area for solids such as sediments that pass through the media 117 of the filtration media layer 115. The porous layer 130 may retain a permanent pool of liquid. In another implementation, the area occupied by the porous layer 130 may be an open space (explained in greater detail below with respect to FIGS. 2A-2I).

A plurality of shields 105 are disposed between the perforated portions of the plurality of pipes 119 and the media 117 of the filtration media layer 115. The plurality of shields 105 are adapted to prevent liquids and sediments from entering the perforated portions of the plurality of pipes 119 directly from the media 117 of the filtration media layer 115. As a result, the flow of liquid must pass through the porous layer 130 before entering the perforated portions of the plurality of pipes 119 (explained in greater detail below with respect to FIG. 6).

Figure 5:
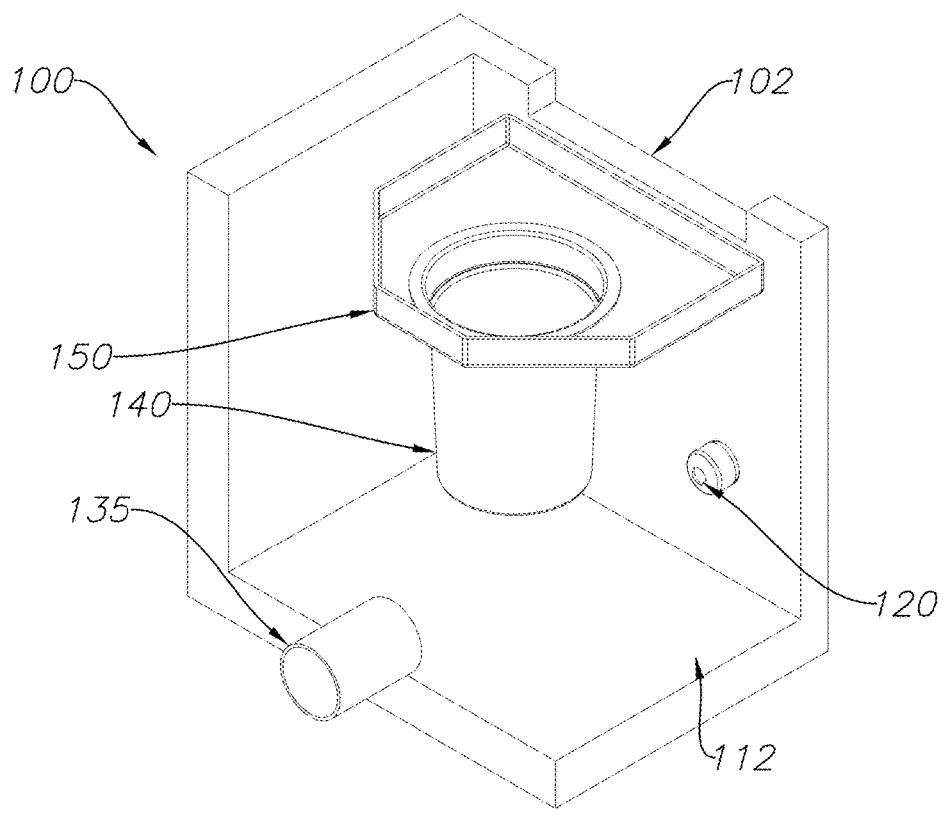
FIG. 5 is an isometric view of the outflow chamber enlarged with the slab removed.
Figure 6:
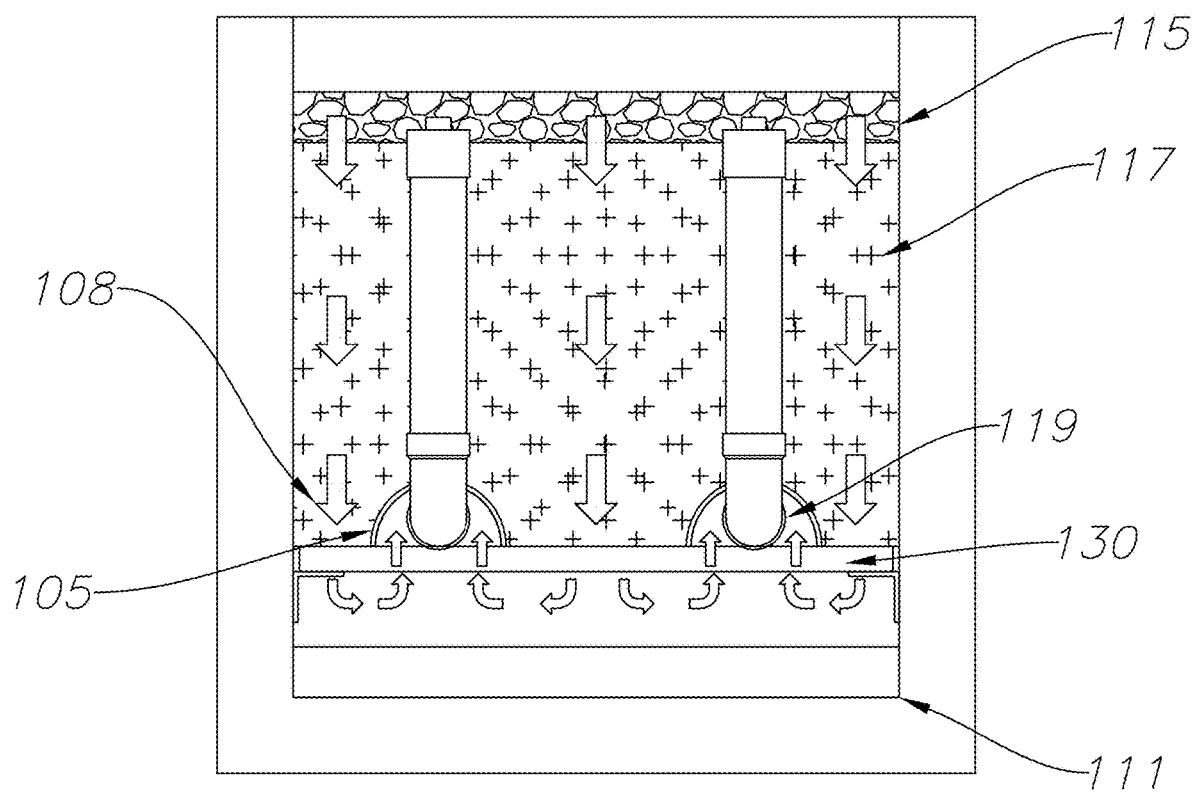
FIG. 6 is a sectional view showing water flow direction down through media, and up into perforated pipes in accordance with an implementation of the invention.

As shown in FIG. 6, with respect to the flow direction of liquid, once the liquid enters the treatment chamber 111, the liquid is drawn downward through the filtration media layer 115. After passing the media 117 of the filtration media layer 115, the liquid is then drawn around the plurality of shields 105, past the plurality of pipes 119, where the liquid is ultimately accumulated in the porous layer 130. When the level of accumulated liquid in the treatment chamber 111 is at or above the plurality of pipes 119, the liquid is drawn through the perforated pipe portions into one or more of the plurality of pipes 119, and directed into the outflow chamber 112 through the outlet 120 of the plurality of pipes 119. Ultimately, the liquid is ejected from the outflow chamber 112 through an outlet 135 of the outflow chamber 112 (explained in greater detail below with respect to FIG. 5).

Referring back to FIGS. 1A-1I, and in accordance with the example implementation shown in FIG. 5, the outflow chamber 112 is housed within the vault 100 adjacent to the treatment chamber 111. The outflow chamber 112 contains a tray 150, a filter 140, and an outlet 135. A bypass channel 102 positioned above the filtration media layer 115, is adapted to direct overflow liquid from the treatment chamber 115 into the outflow chamber 112. The bypass channel 102 may vary in size so long as there is no possibility for the bypass channel 102 to become blinded by floating solids.

The tray 150 is positioned in line with the bypass channel 102, and contains the filter 140. The filter 140 sits in the tray in line with the bypass channel and is adapted to filter solids from any overflow liquid that enters through the bypass channel 102. The filter 140 may be permeable to allow liquids to flow into the outflow chamber 112 in the event that the filter 140 is completely blinded by solids. The filter 120 is removable and serviceable through an opening 101 at the top of the outflow chamber 112.

A slab 155 may be positioned substantially over the outflow chamber 112. The slab may have a passage that coincides with the opening 101 of the outflow chamber 112 to allow for servicing and removal of the filter 140.

The outlet 135 of the outflow chamber 112 is adapted to direct treated liquid from the outflow chamber 112 to outside the treatment system.

Referring now to FIGS. 2A-2I, in a further implementation the liquid treatment system may include a service portal 260, a permeable screen structure 230, and an open space 231. The service portal 260 may be positioned within the filtration media layer 215 of the treatment chamber 211 between the plurality of pipes 219. The service portal 260 allows access to the open space 231 from above the filtration media layer 215.

The plurality of pipes 219 may be supported by a permeable screen structure 230 that is adjacent to the bottom of the treatment chamber 211. The open space 231 is positioned between the permeable screen structure 230 and the bottom of the treatment chamber 211. The open space 231 may function as a settling area for solids such as sediments that pass through the media 217 of the filtration media layer 215. The open space 231 may retain a permanent pool of liquid.

In another implementation, as shown in FIGS. 4A-4I, a high-pressure water spray system may be positioned within the open space 431. The high-pressure water spray system is adapted to convey water from a source outside the liquid treatment system into the open space 431. The high-pressure water spray system may be comprised of at least one spray bar 490 disposed, at least partially, within the open space 431. The spray bar 490 will be a liquid conveyance 480 and can be made of either pipe or hose having an open end 465 and a closed end. The conveyance 480 of the spray bar 490 may have a plurality of orifices along its sides. The open end 465 may be adapted to connect to a high-pressure water source. A water source may be coupled to the open end 465 of the high-pressure water spray system within the service portal to provide water to the high-pressure water spray system. As water is pumped through the high-pressure water spray system, the water travels along at least one conveyance 480 and is eventually expelled through the plurality of orifices to separate debris that has settled in the open space 431 of the treatment chamber 411.

In a further implementation, the treatment chamber 411 may be comprised of one or more walls and a floor, wherein at a least a portion of the floor has a sloped surface 470. The sloped surface 470 may descend from at least one of the walls down to a location on the floor. The sloped surface 470 allows the high-pressure water spray system to flush accumulated debris to a location on the floor that is easily accessible by a servicing vacuum descended through the service portal 460.

Figure 7A:
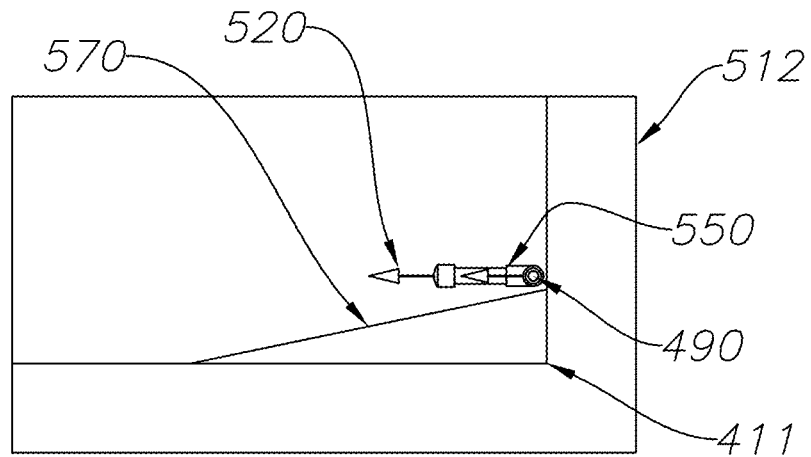
FIGS. 7A & 7B are side sectional views that illustrate the alignment of a spray bar on a portion of the treatment chamber floor having a sloped surface in accordance with an implementation of the invention.
Figure 7B:
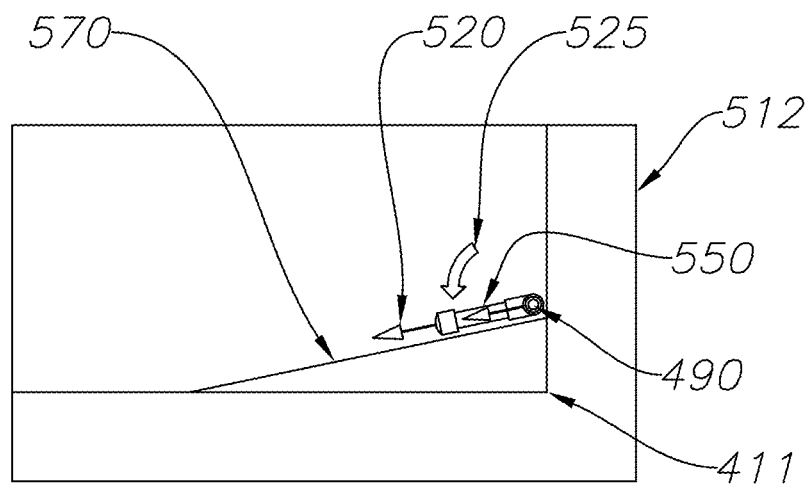

FIGS. 7A & 7B illustrates the alignment of a spray bar 490 on a portion of the treatment chamber 411 floor having a sloped surface 570. In FIG. 7A, the spray bar 490 is angled perpendicular to the wall of the treatment chamber 411, and positioned at the peak of the sloped surface 570 adjacent to the wall of the treatment chamber 411. During installation of the liquid treatment system, the angle of the spray bar 490 is adjustable by rotating the spray bar 490 about an aiming lever 550. To increase performance, the spray bar 490 may be angled (525) so that it is substantially parallel to the sloped surface 570, as shown in FIG. 7B. In this position, liquid expelled from the orifice of the spray bar 490 is able to engage the debris along the sloped surface 570, and thus force the debris to a location on the floor that is easily accessible by a servicing vacuum descended through the service portal 460. The use of spray bars 490 in conjunction with the sloped surface 570 is shown in greater detail in FIGS. 8A-8F.

In FIGS. 8A-8F, the progression of debris breakdown within the treatment chamber is shown. Debris can become highly compacted as it accumulates in the open space 431. In addition, sediment, leaves, and twigs can become integrated throughout the accumulated debris. The presence of leaves and twigs enhances the general structure of the accumulated debris.

Beginning with FIG. 8A, the debris has completely settled and become compacted within the open space 431 of the treatment chamber 411. In FIG. 8B, liquid expelled from the spray bars 490 angled parallel (520) to the sloped surfaces 570, have begun to undermine the debris without the majority of the debris collapsing to the floor. A bridge of debris has now formed within the open space 431 of the treatment chamber 411. In FIGS. 8C & 8D, vertical extending spray bars 540 located adjacent to the walls of the treatment chamber 411, have broken down the debris to the point where the debris collapses to the floor of the treatment chamber 411 (as shown in FIG. 8E). The vertical extending spray bars 540 and floor spray bars 490 will continue to liquefy and breakdown the debris, and force the debris to a location on the floor that is easily accessible by a servicing vacuum descended through the service portal. From here, the debris may be vacuumed out, as shown in FIG. 8F.

Any reference in this specification to "one implementation," "an implementation," an "example implementation," etc., means that a particular feature, structure, or characteristic described in connection with the implementation is included in at least one implementation of the invention. The appearances of such phrases in various places in the specification are not necessarily referring to the same implementation. In addition, any elements or limitations of any invention or implementation thereof disclosed herein can be combined with any and/or all other elements or limitations (individually or in any combination) or any invention or implementation thereof disclosed herein, and all such combinations are contemplated with the scope of the invention without limitation thereto.

It should be understood that the examples and implementations described herein are for illustrative purposes only and that various modifications or changes in light thereof will be suggested to persons skilled in the art and are to be included within the spirit and purview of this application.

The invention claimed is:

1. A liquid treatment system comprising:
   a vault having a treatment chamber and an outflow chamber;
   a liquid inlet positioned to direct liquid into said treatment chamber from outside the treatment system;
   a porous layer adjacent to the bottom of the treatment chamber;
   a plurality of slightly inclined but substantially horizontal pipes positioned to direct liquid from the treatment chamber into the outflow chamber, and supported by said porous layer, at least a portion of each of said plurality of pipes being perforated;
   a filtration media layer located directly above said plurality of pipes;
   a plurality of shields disposed between the perforated portions of said plurality of pipes and said filtration media layer, said shields adapted to prevent liquid from entering the perforated portions of said plurality of pipes directly from said layer of filtration media; and
   an outlet adapted to direct treated liquid from said outflow chamber to outside the system.

2. The liquid treatment system of claim 1 wherein upon entering said treatment chamber, liquid is drawn downward through said filtration media layer, then drawn around said plurality of shields, past said plurality of pipes, and accumulated in said porous layer; and
   wherein upon accumulation of said liquid in the treatment chamber to a level that is at or above that of said plurality of pipes, said liquid is drawn through said perforated pipe portions into one or more of said plurality of pipes, directed into said outflow chamber, and ejected through said outlet.

3. The liquid treatment system of claim 1, wherein an intermediate portion, downstream of said perforated portion, of at least one pipe in said plurality of pipes, is elevated with respect to the remaining portions of said pipe.

4. The liquid treatment system of claim 3, further comprising an air vent connecting the top of said elevated portion of said pipe to the ambient air outside the treatment system.

5. The liquid treatment system of claim 4, wherein said air vent is adapted to prevent liquids from entering said pipe through said air vent.

6. The liquid treatment system of claim 1, wherein said plurality of pipes have a plurality of maximum flow rates.

7. The liquid treatment system of claim 1, further comprising a bypass channel positioned above said filtration media layer adapted for directing overflow liquid from said treatment chamber into said outflow chamber.

8. The liquid treatment system of claim 7, further comprising a filter in line with said bypass channel adapted to filter solids from said overflow liquid.

9. The liquid treatment system of claim 8, wherein said filter is adapted to permit fluid to flow into said outflow chamber in the event said filter is fully blinded by solids.

10. The liquid treatment system of claim 8, wherein said filter is removable through an opening in said outflow chamber.

11. The liquid treatment system of claim 8, wherein said filter is serviceable through an opening in said outflow chamber.

12. The liquid treatment system of claim 1, wherein said filtration media layer is suitable for sustaining living plants.

\* \* \* \* \*